United States Patent
Verma et al.

(10) Patent No.: US 10,419,186 B2
(45) Date of Patent: Sep. 17, 2019

(54) MOBILITY COMMUNICATION USING MID-AMBLES

(71) Applicant: QUALCOMM Incorporated, San Diego, CA (US)

(72) Inventors: Lochan Verma, San Diego, CA (US); Sameer Vermani, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/816,560

(22) Filed: Nov. 17, 2017

(65) Prior Publication Data

US 2018/0145812 A1 May 24, 2018

Related U.S. Application Data

(60) Provisional application No. 62/424,521, filed on Nov. 20, 2016, provisional application No. 62/445,213, (Continued)

(51) Int. Cl.
*H04B 7/00* (2006.01)
*H04L 5/00* (2006.01)
(Continued)

(52) U.S. Cl.
CPC .......... *H04L 5/0053* (2013.01); *H04L 1/0025* (2013.01); *H04L 5/0091* (2013.01); (Continued)

(58) Field of Classification Search
CPC . H04W 76/02; H04W 76/021; H04W 76/027; H04W 88/08
(Continued)

(56) References Cited

U.S. PATENT DOCUMENTS 8,462,863 B1 * 6/2013 Zhang ................. H04L 27/2613
375/260
8,781,014 B2 7/2014 Wang et al.
(Continued)

FOREIGN PATENT DOCUMENTS

CN 103209043 A 7/2013
EP 3319261 A1 5/2018
(Continued)

OTHER PUBLICATIONS

Stacey, IEEE P802.11, Wireless LANs, IEEE, May 2016, pp. 1-61.*
(Continued)

*Primary Examiner* — Dmitry Levitan
(74) *Attorney, Agent, or Firm* — Steven R. Thiel; Loza & Loza LLP

(57) ABSTRACT

Various aspects of the disclosure relate to communication using a data unit that includes at least one mid-amble. In some aspects, an apparatus may use mid-ambles for mobility scenarios (e.g., when the apparatus is moving outdoors). The disclosure relates in some aspects to signaling associated with the use of mid-ambles. In some aspects, an apparatus may signal whether it supports sending and/or receiving data with mid-ambles. In some aspects, an apparatus may signal whether a particular data unit includes at least one mid-amble. In some aspects, an apparatus may signal an indication of at least one mid-amble update interval. In some aspects, an apparatus may signal whether a mid-amble includes a short training field.

20 Claims, 31 Drawing Sheets

Related U.S. Application Data filed on Jan. 11, 2017, provisional application No. 62/468,314, filed on Mar. 7, 2017.

(51) Int. Cl.
| | |
|---|---|
| *H04L 1/00* | (2006.01) |
| *H04L 27/26* | (2006.01) |
| *H04B 7/0413* | (2017.01) |
| *H04L 29/08* | (2006.01) |
| *H04W 84/12* | (2009.01) |

(52) U.S. Cl.
CPC .......... *H04L 27/261* (2013.01); *H04B 7/0413* (2013.01); *H04L 69/323* (2013.01); *H04W 84/12* (2013.01)

(58) Field of Classification Search
USPC ................ 370/310, 341, 348, 436, 437, 465
See application file for complete search history.

(56) References Cited

U.S. PATENT DOCUMENTS

| | | | |
|---|---|---|---|
| 9,078,169 B2* | 7/2015 | Zhang | H04W 28/18 |
| 9,351,333 B1* | 5/2016 | Zhang | H04W 84/12 |
| 9,596,715 B1* | 3/2017 | Zhang | H04L 27/2647 |
| 9,706,599 B1* | 7/2017 | Zhang | H04W 84/12 |
| 10,045,299 B2* | 8/2018 | Atefi | H04W 52/146 |
| 2004/0101032 A1 | 5/2004 | Dabak et al. | |
| 2005/0250506 A1 | 11/2005 | Beale et al. | |
| 2010/0098146 A1 | 4/2010 | Kim et al. | |
| 2010/0165954 A1 | 7/2010 | Lin et al. | |
| 2011/0026627 A1 | 2/2011 | Chun et al. | |
| 2012/0269142 A1* | 10/2012 | Porat | H04W 72/1231 370/329 |
| 2012/0327871 A1* | 12/2012 | Ghosh | H04L 5/0023 370/329 |
| 2013/0279379 A1 | 10/2013 | Yang et al. | |
| 2016/0065467 A1 | 3/2016 | Wu et al. | |
| 2017/0134207 A1 | 5/2017 | Liu et al. | |
| 2017/0303208 A1* | 10/2017 | Suh | H04W 52/346 |
| 2018/0132223 A1 | 5/2018 | Sankar et al. | |
| 2018/0145733 A1 | 5/2018 | Verma et al. | |
| 2018/0145812 A1* | 5/2018 | Verma | H04L 5/0053 |
| 2018/0146076 A1 | 5/2018 | Verma et al. | |
| 2018/0205441 A1 | 7/2018 | Asterjadhi et al. | |
| 2018/0262366 A1 | 9/2018 | Sahin et al. | |
| 2018/0376507 A1 | 12/2018 | Kwon et al. | |

FOREIGN PATENT DOCUMENTS

| | | |
|---|---|---|
| WO | 2012158557 A1 | 11/2012 |
| WO | 2013155097 A1 | 10/2013 |
| WO | 2018084900 A1 | 5/2018 |

OTHER PUBLICATIONS

International Search Report and Written Opinion—PCT/US2017/062648—ISA/EPO—dated Mar. 1, 2018.

Marvell: "TGax Jul. 2017 Berlin Phy Ad-Hoc Meeting Minutes", IEEE Draft; 11-17-1094-00-00AX-TGAX-JULY-2017-BERLIN-PHYAD-HOC-MEETING-MINUTES, IEEE-SA Mentor, Piscataway, NJ USA vol. 802.11 ax Jul. 13, 2017 (Jul. 13, 2017), pp. 1-8, XP068116592, Retrieved from the Internet: URL: https://mentor.ieee.org/802.11/dcn/17/11/17-1094-00-00ax-tgax-july-2017-berlin-phy-ad-hoc-meeting-mi . . . [retrieved on Jul. 13, 2017].

QUALCOMM: "Follow-up on Doppler Design in 802.11ax", IEEE Draft; 11-17-0960-00-00AX-FOLLOW-UP-ON-DOPPLER-DESIGN-IN-802-11AX, IEEE-SA Mentor, Piscataway, NJ USA, vol. 802.11ax, Jul. 10, 2017 (Jul. 10, 2017), pp. 1-16, XP068116322, Retrieved from the Internet: URL:https://mentor.ieee.org/802.11/dcn/17/11-17-0960-00-00ax-follow-up-on-doppler-design-in-802-11ax.ppt . . . [retrieved on Jul. 10, 2017].

Adrian P. Stephens, et al.; "Draft Standard for Information technology—Tele-communications and information exchange between systems Local and metropolitan area networks—Specific requirements, Part 11: Wireless LAN Medium Access Control (MAC) and Physical Layer (PHY) Specification, Amendment 6: Enhancements for High Efficiency WLAN"; LAN/MAN Standards Committee of the IEEE Computer Society; IEEE P802.11ax/D2.0, Oct. 2017, 596 pages.

Dorothy Stanley, et al.; "Draft Standard for Information technology—Tele-communications and information exchange between systems Local and metropolitan area networks—Specific requirements, Part 11: Wireless LAN Medium Access Control (MAC) and Physical Layer (PHY) Specification, Amendment 6: Enhancements for High Efficiency WLAN"; LAN/MAN Standards Committee of the IEEE Computer Society; IEEE P802.11ax/D3.0, Jun. 2018, 682 pages.

Dorothy Stanley, et al.; "Draft Standard for Information technology—Tele-communications and information exchange between systems Local and metropolitan area networks—Specific requirements, Part 11: Wireless LAN Medium Access Control (MAC) and Physical Layer (PHY) Specification, Amendment 6: Enhancements for High Efficiency WLAN"; LAN/MAN Standards Committee of the IEEE Computer Society; IEEE P802.11ax/D4.0, Feb. 2019, 746 pages.

* cited by examiner

| FIELD | BITS | DESCRIPTION |
|---|---|---|
| MID-AMBLE FREQUENCY | 2 | 0 → MID-AMBLE FREQUENCY OF 4.<br>1 → MID-AMBLE FREQUENCY OF 10.<br>2 → MID-AMBLE FREQUENCY OF 20.<br>3 → MID-AMBLE FREQUENCY OF 40. |

*FIG. 9*

1002 ↘ DOPPLER = 0

| FIELD | NUMBER OF BITS | DESCRIPTION |
|---|---|---|
| Nsts | 3 | NUMBER OF SPACE-TIME STREAMS MINUS 1 (VALUES 0 – 7) |
| DOPPLER | 1 | SET TO 0 |
| OTHERS | ... | ... |

DOPPLER = 1   ↗ 1004

| FIELD | NUMBER OF BITS | DESCRIPTION |
|---|---|---|
| Nsts | 1 | NUMBER OF SPACE-TIME STREAMS MINUS 1 (VALUES 0 – 1) |
| MID-AMBLE FREQUENCY | 2 | INDICATES MID-AMBLE FREQUENCY |
| DOPPLER | 1 | SET TO 1 |
| OTHERS | ... | ... |

*FIG. 10*

MOBILITY COMMUNICATION USING MID-AMBLES

CROSS-REFERENCE TO RELATED APPLICATION(S)

This application claims priority to and the benefit of provisional patent application No. 62/424,521 filed in the U.S. Patent and Trademark Office on Nov. 20, 2016, provisional patent application No. 62/445,213 filed in the U.S. Patent and Trademark Office on Jan. 11, 2017, and provisional patent application No. 62/468,314 filed in the U.S. Patent and Trademark Office on Mar. 7, 2017, the entire content of each of which is incorporated herein by reference.

INTRODUCTION

Various aspects described herein relate to wireless communication and, more particularly but not exclusively, to communication involving data units that include at least one mid-amble.

Some types of wireless communication devices employ multiple antennas to provide a higher level of performance as compared to devices that use a single antenna. For example, a wireless multiple-in-multiple-out (MIMO) system (e.g., a wireless local area network (WLAN) that supports IEEE 802.11ax) may use multiple transmit antennas to provide beamforming-based signal transmission. Typically, beamforming-based signals transmitted from different antennas are adjusted in phase (and optionally amplitude) such that the resulting signal power is focused toward a receiver device (e.g., an access terminal).

A wireless MIMO system may support communication for a single user at a time or for several users concurrently. Transmissions to a single user (e.g., a single receiver device) are commonly referred to as single-user MIMO (SU-MIMO), while concurrent transmissions to multiple users are commonly referred to as multi-user MIMO (MU-MIMO).

An access point (e.g., a base station) of a MIMO system employs multiple antennas for data transmission and reception, while each user employs one or more antennas. The access point communicates with the users via forward link channels and reverse link channels. In some aspects, a forward link (or downlink) channel refers to a communication channel from a transmit antenna of the access point to a receive antenna of a user, and a reverse link (or uplink) channel refers to a communication channel from a transmit antenna of a user to a receive antenna of the access point.

MIMO channels corresponding to transmissions from a set of transmit antennas to a receive antenna are referred to spatial streams since precoding (e.g., beamforming) is employed to direct the transmissions toward the receive antenna. Consequently, in some aspects each spatial stream corresponds to at least one dimension. A MIMO system thus provides improved performance (e.g., higher throughput and/or greater reliability) through the use of the additional dimensionalities provided by these spatial streams.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides an apparatus configured for communication. The apparatus includes: a processing system configured to generate an indication of whether the apparatus supports communication using at least one mid-amble; and an interface configured to output the indication for transmission.

In some aspects, the disclosure provides a method for communication including: generating an indication of whether the apparatus supports communication using at least one mid-amble; and outputting the indication for transmission.

In some aspects, the disclosure provides an apparatus configured for communication. The apparatus includes: means for generating an indication of whether the apparatus supports communication using at least one mid-amble; and means for outputting the indication for transmission.

In some aspects, the disclosure provides a wireless node. The wireless node includes: a processing system configured to generate an indication of whether the wireless node supports communication using at least one mid-amble; and a transmitter configured to transmit the indication.

In some aspects, the disclosure provides a computer-readable medium (e.g., a non-transitory computer-readable medium) storing computer-executable code, including code to: generate an indication of whether an apparatus supports communication using at least one mid-amble; and output the indication for transmission.

In some aspects, the disclosure provides an apparatus configured for communication. The apparatus includes: an interface configured to obtain an indication of whether another apparatus supports communication using at least one mid-amble; and a processing system configured to process data units comprising at least one mid-amble if the indication indicates that the other apparatus supports communication using at least one mid-amble.

In some aspects, the disclosure provides a method for communication including: obtaining an indication of whether another apparatus supports communication using at least one mid-amble; and processing data units comprising at least one mid-amble if the indication indicates that the other apparatus supports communication using at least one mid-amble.

In some aspects, the disclosure provides an apparatus configured for communication. The apparatus includes: means for obtaining an indication of whether another apparatus supports communication using at least one mid-amble; and means for processing data units comprising at least one mid-amble if the indication indicates that the other apparatus supports communication using at least one mid-amble.

In some aspects, the disclosure provides a wireless node. The wireless node includes: a receiver configured to receive obtain an indication of whether another apparatus supports communication using at least one mid-amble; and a processing system configured to process data units comprising at least one mid-amble if the indication indicates that the other apparatus supports communication using at least one mid-amble.

In some aspects, the disclosure provides a computer-readable medium (e.g., a non-transitory computer-readable medium) storing computer-executable code, including code to: obtain an indication of whether another apparatus supports communication using at least one mid-amble; and process data units comprising at least one mid-amble if the indication indicates that the other apparatus supports communication using at least one mid-amble.

In some aspects, the disclosure provides an apparatus configured for communication. The apparatus includes: a processing system configured to generate a data unit that may include an indication of whether the data unit includes at least one mid-amble; and an interface configured to output the data unit for transmission.

In some aspects, the disclosure provides a method for communication including: generating a data unit that may include an indication of whether the data unit includes at least one mid-amble; and outputting the data unit for transmission.

In some aspects, the disclosure provides an apparatus configured for communication. The apparatus includes: means for generating a data unit that may include an indication of whether the data unit includes at least one mid-amble; and means for outputting the data unit for transmission.

In some aspects, the disclosure provides a wireless node. The wireless node includes: a processing system configured to generate a data unit that may include an indication of whether the data unit includes at least one mid-amble; and a transmitter configured to transmit the data unit.

In some aspects, the disclosure provides a computer-readable medium (e.g., a non-transitory computer-readable medium) storing computer-executable code, including code to: generate a data unit that may include an indication of whether the data unit includes at least one mid-amble; and output the data unit for transmission.

In some aspects, the disclosure provides an apparatus configured for communication. The apparatus includes: an interface configured to obtain a data unit that may include an indication of whether the data unit includes at least one mid-amble; and a processing system configured to perform channel estimation based on at least one mid-amble from the data unit if the indication indicates that the data unit includes at least one mid-amble.

In some aspects, the disclosure provides a method for communication including: obtaining a data unit that may include an indication of whether the data unit includes at least one mid-amble; and performing channel estimation based on at least one mid-amble from the data unit if the indication indicates that the data unit includes at least one mid-amble.

In some aspects, the disclosure provides an apparatus configured for communication. The apparatus includes: means for obtaining a data unit that may include an indication of whether the data unit includes at least one mid-amble; and means for performing channel estimation based on at least one mid-amble from the data unit if the indication indicates that the data unit includes at least one mid-amble.

In some aspects, the disclosure provides a wireless node. The wireless node includes: a receiver configured to receive a data unit that may include an indication of whether the data unit includes at least one mid-amble; and a processing system configured to perform channel estimation based on at least one mid-amble from the data unit if the indication indicates that the data unit includes at least one mid-amble.

In some aspects, the disclosure provides a computer-readable medium (e.g., a non-transitory computer-readable medium) storing computer-executable code, including code to: obtain a data unit that may include an indication of whether the data unit includes at least one mid-amble; and perform channel estimation based on at least one mid-amble from the data unit if the indication indicates that the data unit includes at least one mid-amble.

In some aspects, the disclosure provides an apparatus configured for communication. The apparatus includes: a processing system configured to generate mid-amble update interval information and to generate a data unit including a plurality of mid-ambles; and an interface configured to output the mid-amble update interval information and the data unit for transmission.

In some aspects, the disclosure provides a method for communication including: generating mid-amble update interval information and a data unit including a plurality of mid-ambles; and outputting the mid-amble update interval information and the data unit for transmission.

In some aspects, the disclosure provides an apparatus configured for communication. The apparatus includes: means for generating mid-amble update interval information and a data unit including a plurality of mid-ambles; and means for outputting the mid-amble update interval information and the data unit for transmission.

In some aspects, the disclosure provides a wireless node. The wireless node includes: a processing system configured to generate mid-amble update interval information and to generate a data unit including a plurality of mid-ambles; and a transmitter configured to transmit the mid-amble update interval information and the data unit.

In some aspects, the disclosure provides a computer-readable medium (e.g., a non-transitory computer-readable medium) storing computer-executable code, including code to: generate mid-amble update interval information and a data unit including a plurality of mid-ambles; and output the mid-amble update interval information and the data unit for transmission.

In some aspects, the disclosure provides an apparatus configured for communication. The apparatus includes: an interface configured to obtain mid-amble update interval information and a data unit; and a processing system configured to: determine, based on the mid-amble update interval information, where mid-ambles are located in the obtained data unit, and perform channel estimation based on the mid-ambles.

In some aspects, the disclosure provides a method for communication including: obtaining mid-amble update interval information and a data unit; determining, based on the mid-amble update interval information, where mid-ambles are located in the obtained data unit; and performing channel estimation based on the mid-ambles.

In some aspects, the disclosure provides an apparatus configured for communication. The apparatus includes: means for obtaining mid-amble update interval information and a data unit; means for determining, based on the mid-amble update interval information, where mid-ambles are located in the obtained data unit; and means for performing channel estimation based on the mid-ambles.

In some aspects, the disclosure provides a wireless node. The wireless node includes: a receiver configured to receive mid-amble update interval information and a data unit; and a processing system configured to: determine, based on the mid-amble update interval information, where mid-ambles are located in the received data unit, and perform channel estimation based on the mid-ambles.

In some aspects, the disclosure provides a computer-readable medium (e.g., a non-transitory computer-readable medium) storing computer-executable code, including code to: obtain mid-amble update interval information and a data unit; determine, based on the mid-amble update interval information, where mid-ambles are located in the obtained data unit; and perform channel estimation based on the mid-ambles.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

FIG. 9 illustrates an example of mid-amble update interval (mid-amble frequency) values indicated in 2 bits in a High Efficiency (HE) Preamble in accordance with some aspects of the disclosure.

FIG. 10 illustrates an example of mid-amble update interval (mid-amble frequency) signaling in a HE-SIG-A of HE_SU/HE_EXT_SU in accordance with some aspects of the disclosure.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, a method of communication includes generating an indication of whether the apparatus supports communication using mid-ambles; and outputting the indication.

The disclosure relates in some aspects to communication using a data unit that includes at least one mid-amble. In some aspects, an apparatus may use mid-ambles for mobility scenarios (e.g., when the apparatus is moving outdoors).

The disclosure relates in some aspects to a mid-amble-based design for enabling mobility support in IEEE 802.11ax for Single User and/or Multi-User transmissions. In some aspects, access points (APs) and user devices may advertise whether they support mid-amble transmission and mid-amble reception between data symbols. In some aspects, APs and user devices may advertise at least one mid-amble update interval. In some aspects, APs and user devices may indicate in each packet whether the mid-ambles are present or not.

A data unit may take various forms in different implementations. In some aspects, the data unit may be a frame. In some aspects, the data unit may be a Physical Layer Convergence Protocol (PLCP) Protocol Data Unit (PPDU) for Wi-Fi communication.

Figure 1:
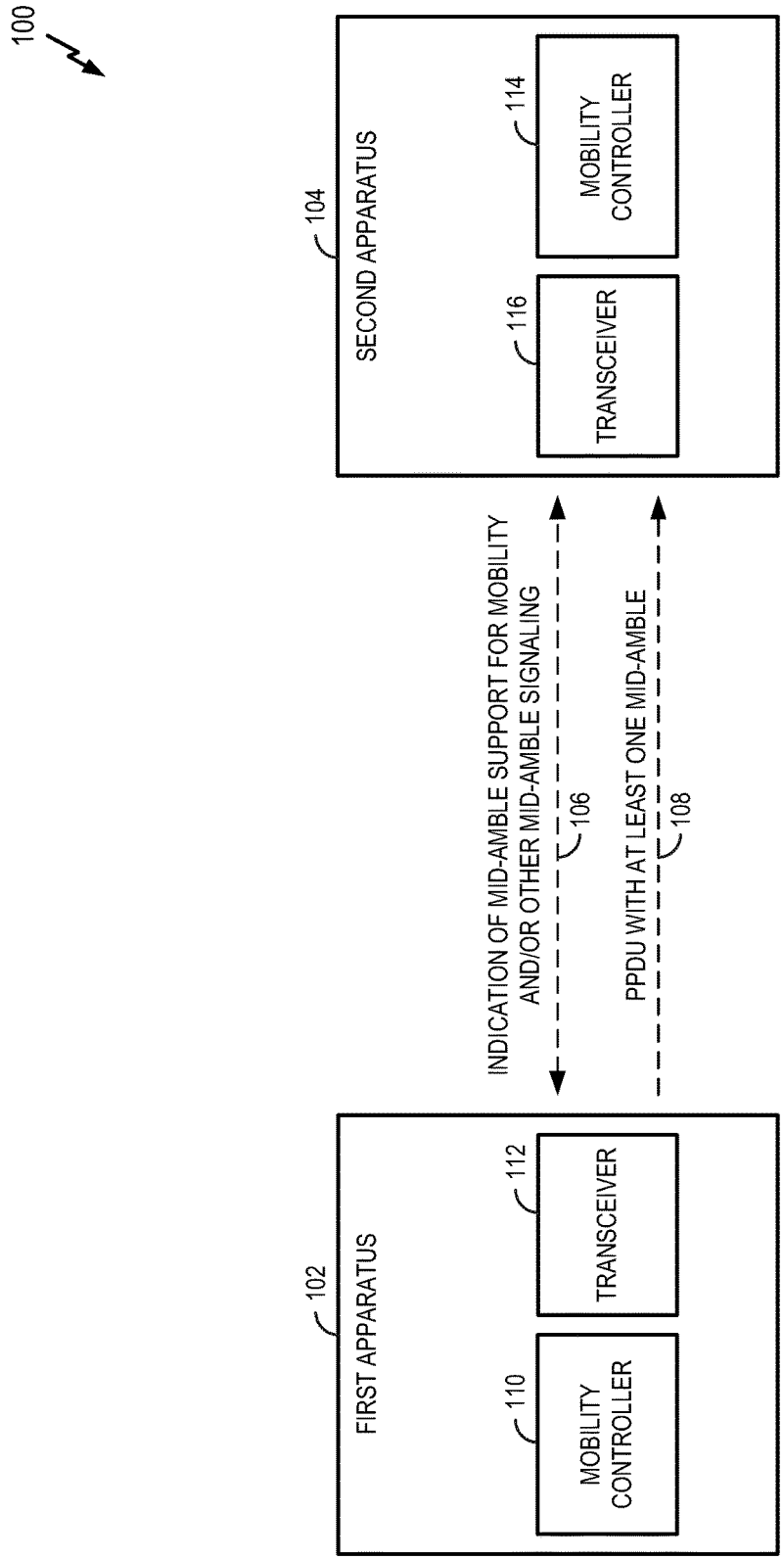
FIG. 1 illustrates an example of a wireless communication system in which aspects of the present disclosure may be employed.

FIG. 1 illustrates a wireless communication system 100 where a first apparatus 102 and a second apparatus 104 signal whether they support mid-ambles for mobility and/or signal other mid-amble-related information 106. If both apparatuses support mid-ambles, the first apparatus 102 sends a PPDU 108 that includes at least one mid-amble to the second apparatus 104. To this end, a mobility controller 110 of the first apparatus 102 may generate information elements and PPDUs to be transmitted by a transceiver 112 and process information elements and PPDUs received by the transceiver 112. Similarly, a mobility controller 114 of the second apparatus 104 may generate information elements and PPDUs to be transmitted by a transceiver 116 and process information elements and PPDUs received by the transceiver 116. The techniques described herein may be used in an 802.11 network, for example, future revisions of the 802.11ax standard or to be developed Wi-Fi standards, or may be used in other types of wireless communication systems.

Wi-Fi Communication

Current state-of-the-art Wi-Fi (IEEE 802.11-based communication) is designed for stationary users. Thus, channel conditions remain relatively constant during communication between a user and a serving AP.

Figure 2:
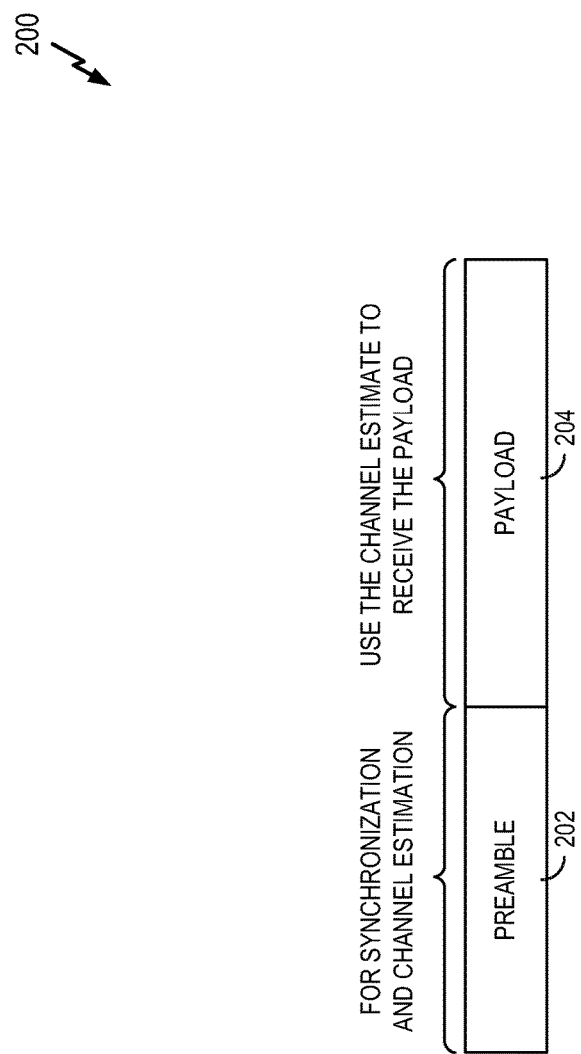
FIG. 2 illustrates an example of a data unit for wireless communication.

FIG. 2 illustrates a typical 802.11 PPDU 200 that included a preamble 202 and a payload 204. A receiving device uses the preamble 202 to detect the signal, synchronize to the signal, and estimate channel conditions (e.g., determine a channel matrix). The channel estimate (e.g., the channel matrix) is then used for receiving the payload 204.

The disclosure relates in some aspects to considering the mobility of Wi-Fi users in designing Wi-Fi signals. In one example mobility scenario, a user is walking on the street while there is moving traffic on the road. In another example mobility scenario, a drone is in wireless communication with another apparatus and is moving relative to the other apparatus. Either the drone or the apparatus could be the serving entity.

In general, state-of-the-art Wi-Fi doesn't work well with mobility. For example, a channel estimate computed during a preamble is not valid forever since the channel varies. However, mobility of a user (or serving entity) may cause a higher variation in the channel as compared with a stationary user (or serving entity) scenario. Thus, a receiver may see a reduction in received signal strength, potentially resulting in a dropped call.

Figure 3:
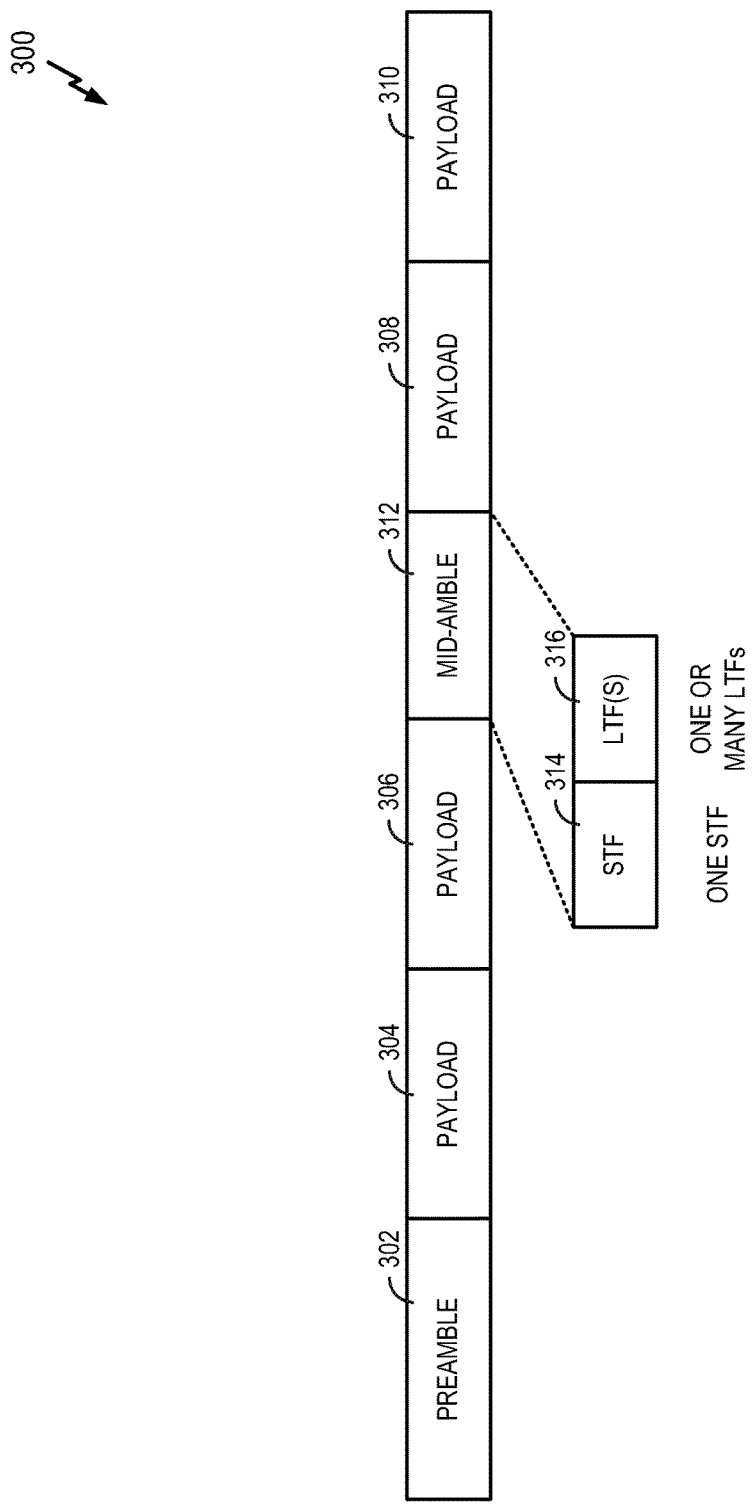
FIG. 3 illustrates example details of the data unit of FIG. 2.

FIG. 3 shows an example PPDU 300 where mid-ambles are inserted (e.g., periodically) between data symbols. The PPDU 300 includes a preamble 302, payload fields 304, 306, 308, and 310, and a mid-amble 312. The preamble 302 may be used for initial automatic gain control (AGC) calibration, carrier frequency offset (CFO) estimation, and channel estimation. The payload fields 304 and 306 may be used to determine an initial channel estimate for reception operations. The payload fields 308 and 310 may be used to determine an updated channel estimate for reception operations.

In some aspects, the mid-amble 312 may be used to provide updated channel estimation for later sections of the payload (e.g., the payload fields 308 and 310). For example, the mid-amble 312 may be used to update at least one of AGC calibration, CFO estimation, timing accuracy, or channel estimation. As indicated, the mid-amble 312 may include a short training field (STF) 314 (e.g., for AGC calibration and/or CFO estimation). In addition, the mid-amble 312 may include one or more long training fields (LTFs) 314 (e.g., for channel estimation).

Example Mobility Design using Mid-Ambles

The disclosure relates in some aspects to mitigating the negative impact of channel estimates becoming stale (and, hence, less accurate) during mobility. To this end, in some aspects, a Doppler (mobility) procedure for 802.11ax (or some other communication specification) uses mid-ambles (e.g., for channel estimation).

The disclosure relates in some aspects to signaling for a mid-amble based design. In some aspects, APs and users may advertise whether they support Mid-amble transmission and mid-amble reception between data symbols. In some aspects, APs and users may advertise the mid-amble update interval to be used. In some aspects, APs and users may indicate in each packet whether mid-ambles are present or not.

The disclosure thus relates in some aspects to extending 802.11ax use to scenarios with mobility of users and/or the environment around them. Consequently, users throughput and/or experience degradation may be controlled through the use of the disclosed techniques.

Figure 4:
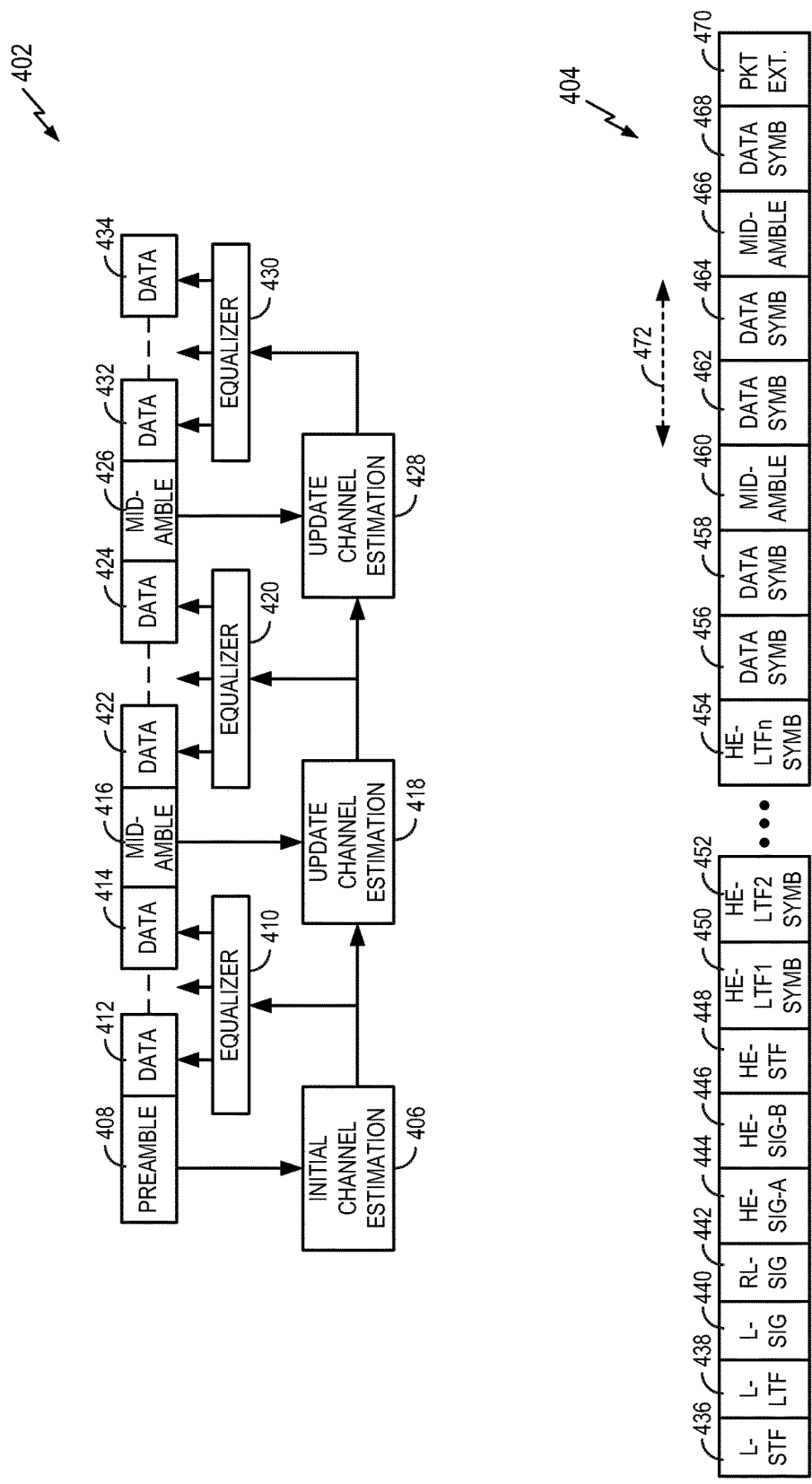
FIG. 4 illustrates an example of receiver operations and single user PPDU for IEEE 802.11ax communication in accordance with some aspects of the disclosure.

FIG. 4 illustrates an example of receiver operations 402 and an example of a single user 802.11ax PPDU 404. Each of these examples illustrates the use of a mid-amble as taught herein.

Referring initially to the receiver operations 402, initial channel estimation 406 is performed based on a preamble 408 of a data unit. An equalizer 410 uses the resulting estimated channel response (CR) to equalize subsequent data symbols 412 to 414. This CR is used until a mid-amble 416 is encountered. As discussed herein, the mid-amble 416 is used to update channel estimation 418 for the data symbols of the data unit that follow. For example, an equalizer 420 may use the resulting estimated CR to equalize subsequent data symbols 422 to 424 until yet another mid-amble 426 is encountered. The mid-amble 426 is used to update channel estimation 428 for the following data symbols. Here, an equalizer 430 uses the resulting estimated CR to equalize subsequent data symbols 432 to 434.

The PPDU includes a legacy STF (L-STF) 436, a legacy LTF (L-LTF) 438, a legacy signal field (L-SIG) 440, a repeated L-SIG (RL-SIG) 442, a high efficiency (HE) signal field A (HE-SIG-A) 444, an HE signal field B (HE-SIG-B) 446, an HE-STF 448, a series of HE-LTFs ("n" HE-LTF symbols represented by HE-LTF1 SYMB 450, HE-LTF2 SYMB 452, through HE-LTFn SYMB 454), a series of data symbols (represented by DATA SYMB 456 and DATA SYMB 458), a mid-amble 460, a series of data symbols (represented by DATA SYMB 462 and DATA SYMB 464), a mid-amble 466, a data symbol (DATA SYMB 468), and a packet extension field (PKT EXT. 470).

The L-STF 436 may be used for coarse channel estimation and AGC estimation. The L-LTF 438 may be used to improve the accuracy of the channel estimation. The HE-STF 448 may be used to improve AGC estimation accuracy in MIMO transmissions. The HE-LTFs may be used to improve channel estimation in MIMO transmissions.

As discussed herein, each mid-amble 460 or 466 may be used to update channel estimation and/or AGC. For example, each mid-amble 460 or 466 may contain one or more HE-LTFs for a channel estimate update. In addition, each mid-amble 460 or 466 may contain an HE-STF for an AGC update. FIG. 4 also illustrates an example of a mid-amble update interval 472.

Figure 5:
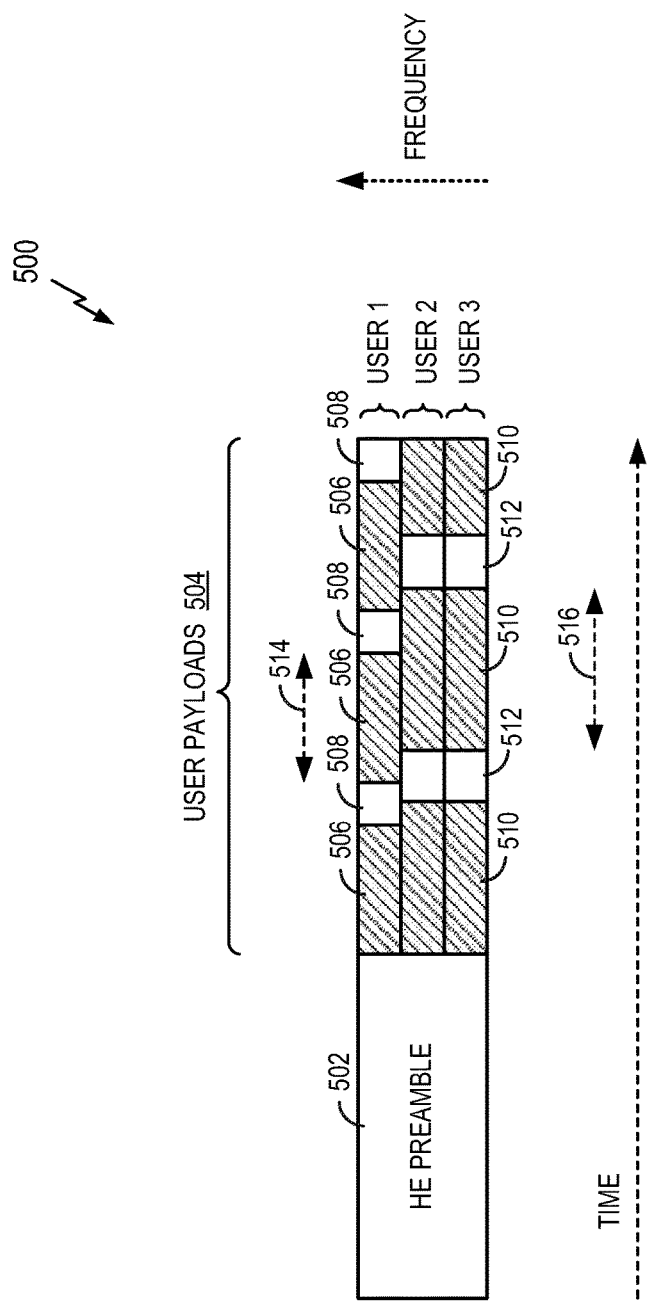
FIG. 5 illustrates an example of a multi-user PPDU for IEEE 802.11ax communication in accordance with some aspects of the disclosure.

FIG. 5 illustrates an example of a multi-user 802.11ax PPDU 500. The PPDU 500 includes a HE preamble 502, and payloads 504 for multiple users (user 1, user 2, and user 3 in this example). Here, different information (e.g., payload) for each user is carried on different sub-carriers.

The HE preamble 502 is common to all of the users. For example, all of the users may synchronize to the common HE preamble 502. The HE preamble may contain a field (not shown) indicating the presence or absence of mid-ambles. If any mid-ambles are present, then the field may be in the transmission to all users.

The payload for each user includes data symbols and pre-ambles. For example, the payload for user 1 includes symbols 506 and mid-ambles 508. As another example, the payload for user 3 includes symbols 510 and mid-ambles 512.

Different users of a MU transmission may use different mid-amble update intervals. For example, the mid-amble update interval 514 for user 1 may be shorter than the mid-amble update interval 516 for user 3. The use of different mid-amble update intervals may be due to, for example, the users moving at different speeds, the users using different data rates, or some other reason.

Example Mid-Amble Structure

Figure 6:
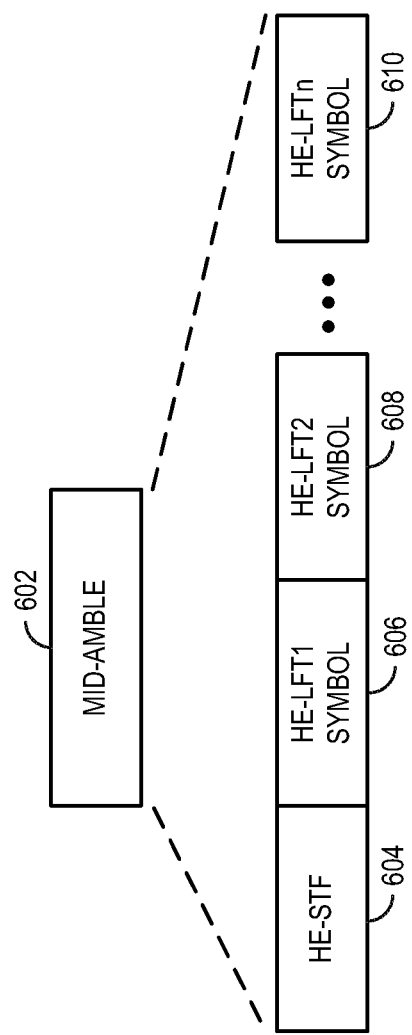
FIG. 6 illustrates an example of a mid-amble structure in accordance with some aspects of the disclosure.

FIG. 6 illustrates an example of an 802.11ax mid-amble 602 in accordance with the teachings herein. The mid-amble 602 includes zero or one HE-STF symbol 604. The mid-amble includes at least one HE-LTF symbol (represented by HE-LTF1 SYMBOL 606, HE-LTF2 SYMBOL 608, through HE-LTFn SYMBOL 610).

In a typical scenario, the number of HE-LTFs in the mid-amble is the same as the number of HE-LTFs in the preamble portion of the PPDU. In other cases, however, there may be a different number of LTFs in these respective fields (e.g., to reduce overhead). Typically, the number of HE-LTFs is the same as the number of space-time streams between the transmitter and the receiver (it is possible that a different number of LTFs could be used, however).

Example Signaling of Mid-Amble Support

The disclosure relates in some aspects to signaling support of a mid-amble procedure in 802.11ax. For example, a capability bit (e.g., 2 bit width) may be advertised by the AP and the users. Here, one bit may indicate the capability to support transmission of mid-ambles in-between data symbols and another bit may indicate capability to support reception of mid-ambles in-between data symbols. In this example, one value of the capability bit indicates that the capability is supported while another value indicates that the capability is not supported. In a typical implementation, an AP will not transmit mid-ambles to a user that does not support reception of mid-ambles. Similarly, in this example scenario, a user will not transmit mid-ambles to an AP that does not support reception of mid-ambles.

Example Signaling of Mid-Amble Presence

The disclosure relates in some aspects to signaling mid-amble presence per packet in 802.11ax. For example, APs and the users may use a bit in the preamble to indicate the presence of mid-ambles in-between the data symbols of a PPDU. One value of this bit may indicate that mid-ambles are present in-between data symbols in "this" PPDU. Another value of this bit may indicate that mid-ambles are not present in-between data symbols in "this" PPDU.

A "Doppler" bit (1 bit width) in the HE-SIG-A of an 802.11ax preamble (or a Doppler bit in some other field) may be used for this purpose. The HE-SIG-A field of the 802.11ax standard contains a Doppler bit. A precise meaning has not been attributed to this bit. It may, in general, be used for mobility. The disclosure thus relates in some aspects to using the Doppler bit or some other bit (or bits) to support mid-amble PPDUs.

Example Signaling of STF Presence in Mid-Amble

The disclosure relates in some aspects to signaling presence of an HE-STF in a mid-amble. For example, a system may define a capability: "HE-STF presence in mid-amble." One value may indicates one HE-STF symbol is present at the start of the mid-ambles sent by an apparatus. Another value may indicate that no HE-STF symbol is present at the start of the mid-ambles.

The presence of the HE-STF may be signaled in various ways. In some aspects, the "HE-STF presence in mid-amble" capability can be advertised through management frames in 802.11ax. This capability field may be carried in HE Capabilities element and/or HE Operations element present in management frames (e.g., a beacon, a probe request, a probe response, an association request, an association response, etc.). The "HE-STF presence in mid-amble" capability could also be signaling in the preamble of each PPDU.

Example Signaling of Mid-Amble Update Interval

The disclosure relates in some aspects to the types of information to be signaled for a mid-amble update interval in 802.11ax. In some aspects, a mid-amble update interval (e.g., a mid-amble periodicity or a mid-amble frequency) may represent the duration between two mid-ambles. For example, a mid-amble update interval $\eta_{ss,MCS}$ may represent the number of data symbols between two mid-ambles for a particular MCS and spatial stream count (ss). Here, ss>0, MCS≥0.

In some aspects, the mid-amble update interval may be a function of data rate. For example, the $\eta_{ss,MCS}$ may decrease for higher MCSs (e.g., a higher data rate associated with a higher MCS may call for a shorter mid-amble update interval). An AP may specify the mid-amble frequency per MCS (e.g., an MCS, mid-amble frequency tuple). As another example, the $\eta_{ss,MCS}$ may decrease for higher spatial stream counts (e.g., a higher data rate associated with a larger number of spatial streams may call for a shorter mid-amble update interval).

The $\eta_{ss,MCS}$ may be advertised by APs and users (clients) for all or a subset of (ss,MCS) tuples. Non-advertised $\eta_{ss,MCS}$ may be calculated through a defined relationship (e.g., defined by a wireless communication specification). For example, APs and clients may advertise 1) $\eta_{ss,MCS0}$ and 2) the ratio of $\eta_{ss,MCSi}$ and $\eta_{ss,MCSi+1}$.

As another example, the $\eta_{ss,MCS}$ values may be defined in a specification for all (ss,MCS) tuples. In this case, the APs and users need not advertise these values.

The mid-amble update interval may be a function of other communication parameters. For example, bandwidth (b) can be another variable appended to the tuple such that $\eta_{b,ss,MCS}$ is advertised by the APs and clients for all or a subset of (b, ss, MCS) tuples. Here, a higher data rate associated with a larger bandwidth may call for a shorter mid-amble update interval.

The disclosure relates in some aspects to how to signal for a mid-amble update interval in 802.11ax. Three options will be described. Other options are possible.

Figure 7:
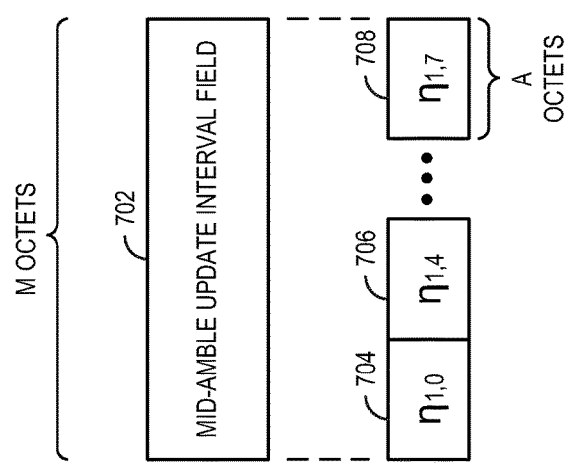
FIG. 7 illustrates an example of signaling a mid-amble update interval in accordance with some aspects of the disclosure.

A first option involves defining a new 802.11 "field" to be carried by 802.11ax management and control packets. FIG. 7 illustrates an example of such a mid-amble update interval field 702. The mid-amble update interval field 702 consists of a number octets (e.g., "M" octets). Within the mid-amble update interval field 702, a number of octets (e.g., "A" octets) carry different interval information (e.g., for different users). In FIG. 7, the value for η corresponds to the (1,0) tuple 704, the (1,4) tuple 706, and the (1,7) tuple 708 advertised (where SS=1 and MCS=0, 4, or 7, respectively). In practice, legacy 802.11 management and control frames might not append this new field since the legacy devices might not understand this field.

Figure 8:
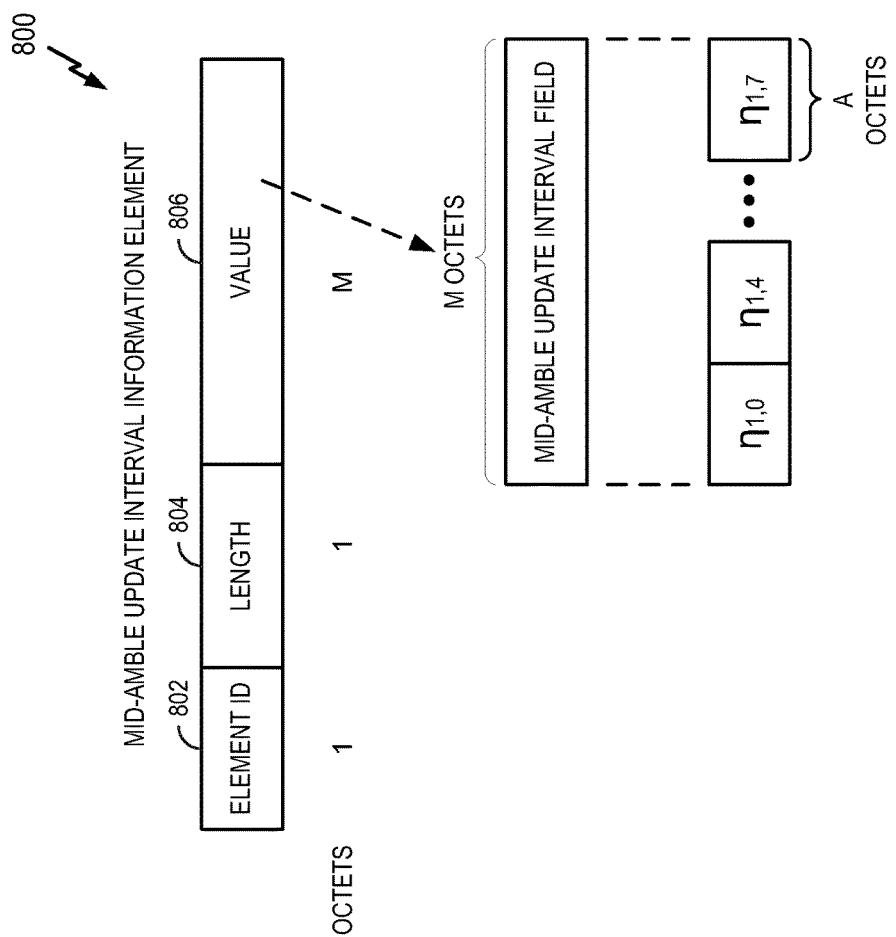
FIG. 8 illustrates another example of signaling a mid-amble update interval in accordance with some aspects of the disclosure.

A second option involves defining a new "Mid-amble Update Interval" Information Element (IE) to be carried by 802.11 management packets. FIG. 8 illustrates an example of such a mid-amble update interval IE 800. The mid-amble update interval IE 800 include an element identifier (ID) field 802, a length field 804, and a value field 806. The value field 806 includes a mid-amble update interval field (e.g., the mid-amble update interval field 702 of FIG. 7).

One possible advantage of this approach is that legacy 802.11 management packets can carry this IE. The legacy devices may understand the TLV (Type Length Value) format even though this field Value is not understood by the legacy devices. Thus, the legacy devices can read the Length field and jump over the Value field without adversely affecting the operation of the legacy devices.

A third option involves indicating the mid-amble frequency (the mid-amble update interval) in an Nsts field or some other field (e.g., by repurposing bits in a field). For example, in scenarios where mid-ambles are present (e.g., as signaled by a Doppler bit), bits of an Nsts field may be repurposed for indicating mid-amble frequency. Conventionally, the Nsts field indicates the number of space time streams. In an example implementation, two of the three bits of an Nsts field may be repurposed for indicating mid-amble frequency. That is, the Nsts signaling will be limited to one bit in this scenario, while mid-amble frequency signaling will be carried by two bits. Conversely, in scenarios where mid-ambles are not present (e.g., as signaled by a Doppler bit), all of the bits of the Nsts field are used for signaling Nsts (i.e., the bits of the Nsts field are not repurposed).

The Nsts field may be carried by different PPDUs in different scenarios. That is, the Nsts field may occur at different places in different frame formats.

For example, Nsts may be carried by an HE SU PPDU. The Nsts field resides in SIG-A in this case. The HE SU PPDU is used for communication between an AP and a single station (for both UL and DL).

As another example, Nsts may be carried by an HE MU PPDU. The Nsts field is indicated in the per-user field of SIG-B. The HE MU PPDU is typically used in the DL when an AP transmits to multiple stations (e.g., for MU-MIMO or OFDMA transmission). However, the HE MU PPDU could also be used for transmission (UL or DL) between an AP and a single station.

As yet another example, for an HE TRIG PPDU scenario, Nsts may be indicated by a spatial stream (SS) allocation (six bits) in a Trigger frame. For this scenario, an AP sets resource and transmission parameters in a Trigger frame and sends the Trigger frame to its stations. These parameters may include, for example, the Doppler, the mid-amble update frequency, the number of spatial streams, etc. In response, a station may send an HE TRIG PPDU to the AP. Thus, for an HE TRIG PPDU scenario, two of the three bits in a Trigger frame for an Nsts field may be repurposed for indicating mid-amble frequency in a scenario where mid-ambles are present (e.g., as signaled by a Doppler bit). Moreover, an AP may schedule all of the stations that support Doppler together. Thus, in some aspects, MU-MIMO or OFDMA scheduling may be based on support of the Doppler bit. To this end, stations may advertise in their capabilities element support for transmission of Doppler and/or reception of Doppler. Thus, an AP will know which stations support Doppler.

Advantageously, by using bits in SIG-A or SIG-B, a device may readily determine whether mid-ambles are present and the mid-amble frequency (e.g., upon reading a single packet). For example, for HE SU PPDU, SIG-A contains the Doppler field and the Nsts field. For HE MU PPDU, SIG-A contains the Doppler field and SIG-B contains the Nsts field. For HE TRIG PPDU, the Trigger frame contains the Doppler field and the Nsts field. Accordingly, this third option may be more efficient than options that use management frames to indicate the mid-amble frequency.

Example Signaling of Mid-Amble Update Interval in HE Fields

Additional examples of signaling a mid-amble update interval (mid-amble frequency) via an IEEE 802.11 high efficiency (HE) field follow. In some scenarios, a mid-amble update interval (mid-amble frequency) may be communicated via an HE signaling field A (HE-SIG-A field). In some scenarios, a mid-amble update interval (mid-amble frequency) may be communicated via an HE Trigger frame (HE-TRIG). In some scenarios, the Doppler cases may be limited to up to 2 space-time streams.

In some implementations, the mid-amble update interval (mid-amble frequency) is signaled in HE-SIG-A in 2 bits. An example of mid-amble update interval (mid-amble frequency) values follows with reference to FIG. 9. Three examples of mid-amble update interval (mid-amble frequency) signaling are illustrated with reference to FIGS. 10-12.

FIG. 9 illustrates an example of mid-amble update interval (mid-amble frequency) values for the case where the mid-amble frequency is indicated in 2 bits in a High Efficiency (HE) Preamble. In this example, bit values of 0/1/2/3/ correspond to mid-amble frequency values of 4/10/20/40, respectively. Other values could be used in other scenarios. In the example of FIG. 9, the mid-amble frequency is an even number since space-time block code (STBC) use is allowed with Doppler. In some aspects, the values listed in FIG. 9 may support a wide range of Doppler cases and MCSs. For example, overhead savings might not be significant for a mid-amble frequency greater than 40.

FIG. 10 illustrates an example of mid-amble update interval (mid-amble frequency) signaling in an HE SU-based PPDU (e.g., in an HE SU PPDU and/or in an HE extended range SU PPDU referred to herein as an HE EXT SU PPDU or, equivalently, an HE ER SU PPDU). In this case, 2 bits may be "borrowed" from the "Nsts" field. That is, an 802.11ax HE SU PPDU (or an HE EXT SU PPDU) includes a preamble with an HE-SIG-A field which, in turn, includes an Nsts field.

Two bits from this Nsts field are repurposed to indicate mid-amble frequency if the Doppler bit is set to 1. For the scenario 1002 where the Doppler bit is a zero, three bits are used to represent the number of space—time streams (Nsts). For the scenario 1004 where the Doppler bit is a one, one bit is used to represent Nsts, while two bits are used to represent the mid-amble frequency.

Figure 11:
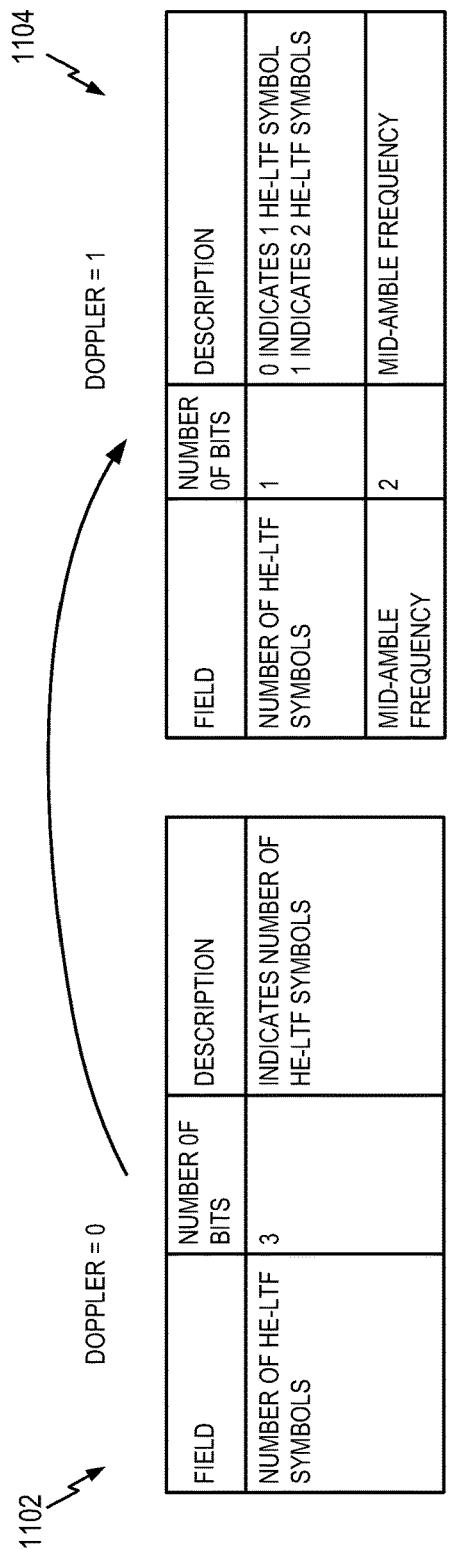
FIG. 11 illustrates an example of mid-amble update interval (mid-amble frequency) signaling in a HE-SIG-A of HE_MU in accordance with some aspects of the disclosure.

FIG. 11 illustrates an example of mid-amble update interval (mid-amble frequency) signaling in an HE MU PPDU. In this case, 2 bits may be "borrowed" from the "number of HE-LTF Symbols" field. That is, two bits from this field are repurposed to indicate mid-amble frequency if the Doppler bit in the HE MU PPDU is set to 1. For the scenario 1102 where the Doppler bit is a zero, three bits are used to represent the number of HE-LTF symbols. For the scenario 1104 where the Doppler bit is a one, one bit is used to represent the number of HE-LTF symbols, while two bits are used to represent the mid-amble frequency. In some aspects, Doppler might not be used with MU-MIMO transmissions since beamforming feedback may become stale relatively quickly.

Figure 12:
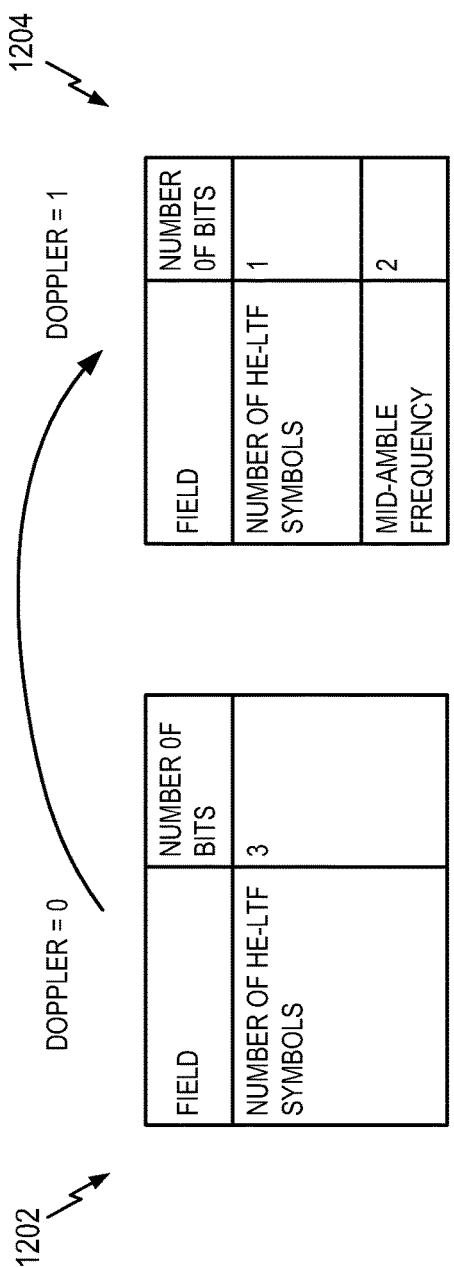
FIG. 12 illustrates an example of mid-amble update interval (mid-amble frequency) signaling in HE_TRIG in accordance with some aspects of the disclosure.

FIG. 12 illustrates an example of mid-amble update interval (mid-amble frequency) signaling in a Trigger frame. In this case, 2 bits may be "borrowed" from the "number of HE-LTF Symbols" field in the Trigger frame (e.g., in a Common Information field of a Trigger frame). That is, two bits from this field are repurposed to indicate mid-amble frequency if the Doppler bit in the Trigger frame is set to 1. For the scenario 1202 where the Doppler bit is a zero, three bits are used to represent the number of HE-LTF symbols. For the scenario 1204 where the Doppler bit is a one, one bit is used to represent the number of HE-LTF symbols, while two bits are used to represent the mid-amble frequency.

In some scenarios, 4 values of mid-amble update interval (mid-amble frequency) may be signaled in HE-SIG-A. For example, for non-Doppler cases, "Nsts" may be 3 bits and the "number of HE-LTF Symbols" may be 3 bits.

In some scenarios, coding may be continuous across the mid-amble.

HE PPDU Examples

In some aspects, the generation of the mid-amble update interval information comprises generating an HE SU PPDU including a preamble or an HE EXT SU PPDU including a preamble, the preamble of the HE SU PPDU having the mid-amble update interval information therein or the preamble of the HE EXT SU PPDU having the mid-amble update interval information therein; and the mid-amble update interval information is output for transmission via the HE SU PPDU or the HE EXT SU PPDU. In some aspects, the HE SU PPDU or the HE EXT SU PPDU includes an HE-SIG-A field that has an Nsts field and a Doppler bit; and if the Doppler bit is set to a value of 1, at least one bit of the Nsts field is repurposed to carry the mid-amble update interval information.

In some aspects, the generation of the mid-amble update interval information comprises generating an HE MU PPDU including a preamble, the preamble including the mid-amble update interval information therein; and the mid-amble update interval information is output for transmission via the HE MU PPDU. In some aspects, the HE MU PPDU preamble includes a Number of HE-LTF Symbols field, the Number of HE-LTF Symbols field having the mid-amble update interval information therein. In some aspects, the HE MU PPDU includes an HE-SIG-A field that has a Doppler bit; and if the Doppler bit is set to a value of 1, at least one bit of the Number of HE-LTF Symbols field is repurposed to carry the mid-amble update interval information.

In some aspects, the generation of the mid-amble update interval information comprises generating a Trigger frame including a Number of HE-LTF Symbols field, the Number of HE-LTF Symbols field having the mid-amble update interval information therein; and the mid-amble update interval information is output for transmission via the Trigger frame. In some aspects, the Trigger frame includes a Common Information field that has a Doppler bit; and if the Doppler bit is set to a value of 1, at least one bit of the Number of HE-LTF Symbols field is repurposed to carry the mid-amble update interval information.

In some aspects, the obtaining of the mid-amble update interval information comprises obtaining an HE SU PPDU including a preamble or an HE EXT SU PPDU including a preamble, the preamble of the HE SU PPDU having the mid-amble update interval information therein or the preamble of the HE EXT SU PPDU having the mid-amble update interval information therein. In some aspects, the determination of where mid-ambles are located in the data unit is based on the mid-amble update interval information in the HE SU PPDU preamble or the HE EXT SU PPDU preamble.

In some aspects, the obtaining of the mid-amble update interval information comprises obtaining an HE MU PPDU including a preamble, wherein the preamble includes the mid-amble update interval information therein. In some aspects, the determination of where mid-ambles are located in the data unit is based on the mid-amble update interval information in the HE MU PPDU preamble.

In some aspects, the obtaining of the mid-amble update interval information comprises obtaining a Trigger frame including a Number of HE-LTF Symbols field having the mid-amble update interval information therein. In some aspects, the determination of where mid-ambles are located in the data unit is based on the mid-amble update interval information in the Trigger Frame.

Example Wireless Communication System

The teachings herein may be implemented using various wireless technologies and/or various spectra. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, a combination of OFDM and DSSS communication, or other schemes.

Certain of the devices described herein may further implement Multiple Input Multiple Output (MIMO) technology and be implemented as part of an 802.11 protocol. A MIMO system employs multiple ($N_t$) transmit antennas and multiple ($N_r$) receive antennas for data transmission. A MIMO channel formed by the $N_t$ transmit and $N_r$ receive antennas may be decomposed into $N_s$ independent channels, which are also referred to as spatial channels or streams, where $N_s \leq \min\{N_t, N_r\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point ("AP") may also comprise, be implemented as, or known as a Transmit Receive Point (TRP), a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 13:
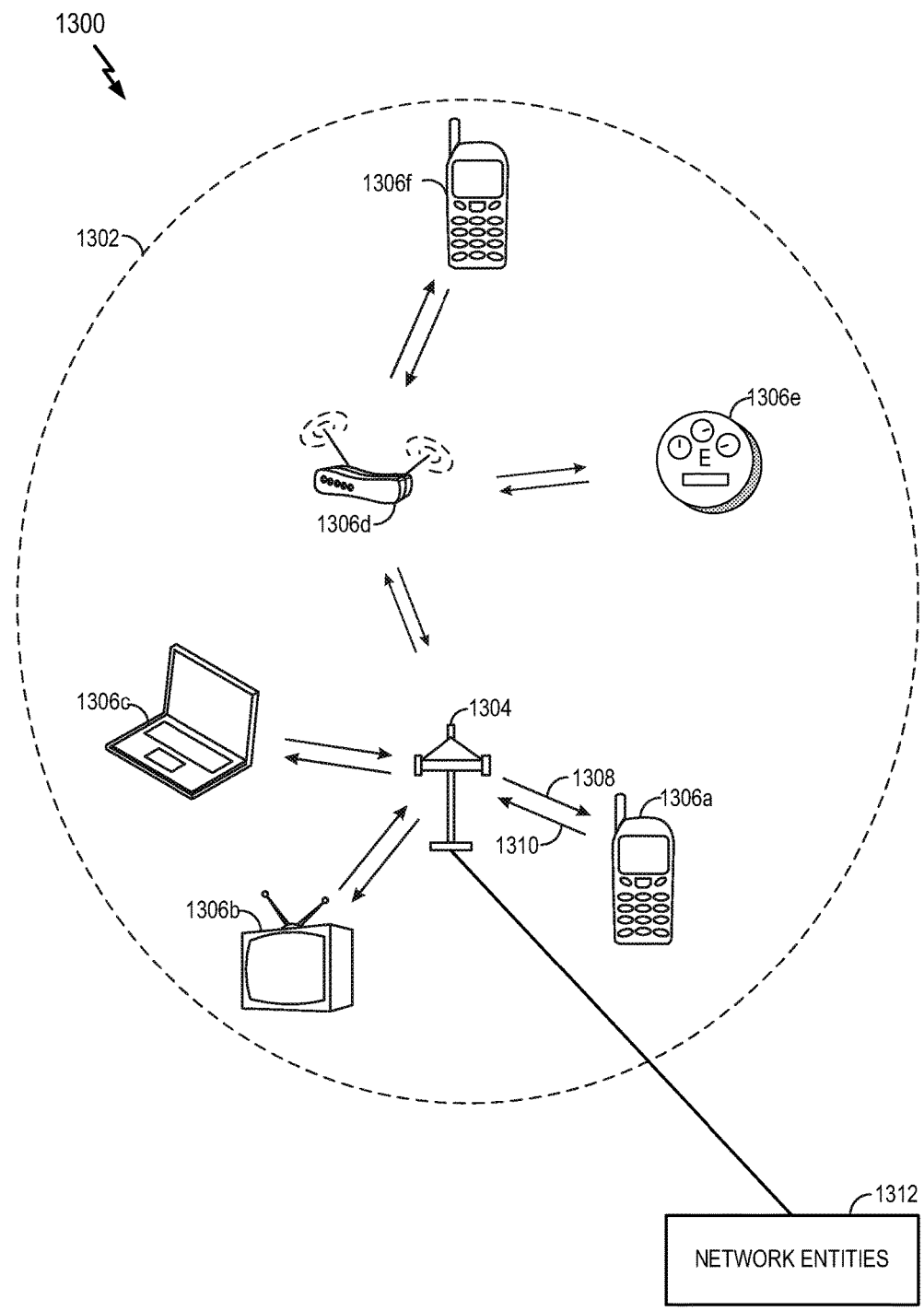
FIG. 13 illustrates an example of a wireless communication system in which aspects of the present disclosure may be employed.

FIG. 13 illustrates an example of a wireless communication system 1300 in which aspects of the present disclosure may be employed. The wireless communication system 1300 may operate pursuant to a wireless standard, for example the 802.11 standard. The wireless communication system 1300 may include an AP 1304, which communicates with STAs 1306*a*, 1306*b*, 1306*c*, 1306*d*, 1306*e*, and 1306*f* (collectively STAs 1306).

STAs 1306*e* and 1306*f* may have difficulty communicating with the AP 1304 or may be out of range and unable to communicate with the AP 1304. As such, another STA 1306*d* may be configured as a relay device (e.g., a device comprising STA and AP functionality) that relays communication between the AP 1304 and the STAs 1306*e* and 1306*f*.

A variety of processes and methods may be used for transmissions in the wireless communication system 1300 between the AP 1304 and the STAs 1306. For example, signals may be sent and received between the AP 1304 and the STAs 1306 in accordance with OFDM/OFDMA techniques. If this is the case, the wireless communication system 1300 may be referred to as an OFDM/OFDMA system. Alternatively, signals may be sent and received between the AP 1304 and the STAs 1306 in accordance with CDMA techniques. If this is the case, the wireless communication system 1300 may be referred to as a CDMA system.

A communication link that facilitates transmission from the AP 1304 to one or more of the STAs 1306 may be referred to as a downlink (DL) 1308, and a communication link that facilitates transmission from one or more of the STAs 1306 to the AP 1304 may be referred to as an uplink (UL) 1310. Alternatively, a downlink 1308 may be referred to as a forward link or a forward channel, and an uplink 1310 may be referred to as a reverse link or a reverse channel.

The AP 1304 may act as a base station and provide wireless communication coverage in a basic service area (BSA) 1302. The AP 1304 along with the STAs 1306 associated with the AP 1304 and that use the AP 1304 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 1304 or to some other access point in the network (not shown).

Each of the access points may communicate with one or more network entities (represented, for convenience, by network entities 1312 in FIG. 13), including each other, to facilitate wide area network connectivity. A network entity may take various forms such as, for example, one or more radio and/or core network entities. Thus, in various implementations the network entities 1312 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 1300 might not have a central AP 1304, but rather may function as a peer-to-peer network between the STAs 1306. Accordingly, the functions of the AP 1304 described herein may alternatively be performed by one or more of the STAs 1306. Also, as mentioned above, a relay may incorporate at least some of the functionality of an AP and a STA.

Figure 14:
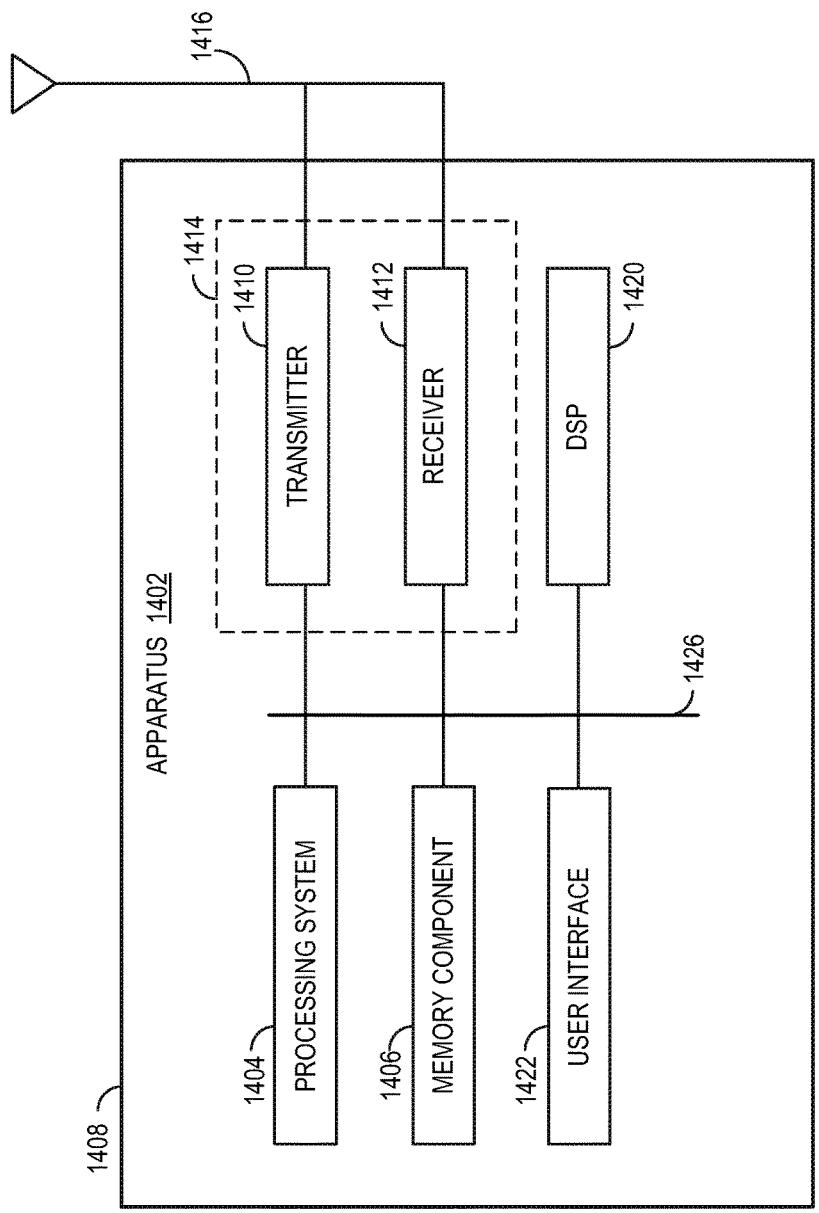
FIG. 14 is a functional block diagram of an example apparatus that may be employed within a wireless communication system in accordance with some aspects of the disclosure.

FIG. 14 illustrates various components that may be utilized in an apparatus 1402 (e.g., a wireless device) that may be employed within the wireless communication system 1300. The apparatus 1402 is an example of a device that may be configured to implement the various methods described herein. For example, the apparatus 1402 may comprise the AP 1304, a relay (e.g., the STA 1306*d*), or one of the STAs 1306 of FIG. 13.

The apparatus 1402 may include a processing system 1404 that controls operation of the apparatus 1402. The processing system 1404 may also be referred to as a central processing unit (CPU). A memory component 1406 (e.g., including a memory device), which may include both read-only memory (ROM) and random access memory (RAM), provides instructions and data to the processing system 1404. A portion of the memory component 1406 may also include non-volatile random access memory (NVRAM). The processing system 1404 typically performs logical and arithmetic operations based on program instructions stored within the memory component 1406. The instructions in the memory component 1406 may be executable to implement the methods described herein.

When the apparatus 1402 is implemented or used as a transmitting node, the processing system 1404 may be configured to select one of a plurality of media access control (MAC) header types, and to generate a packet having that MAC header type. For example, the processing system 1404 may be configured to generate a packet comprising a MAC header and a payload and to determine what type of MAC header to use.

When the apparatus 1402 is implemented or used as a receiving node, the processing system 1404 may be configured to process packets of a plurality of different MAC header types. For example, the processing system 1404 may be configured to determine the type of MAC header used in a packet and process the packet and/or fields of the MAC header.

The processing system 1404 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 1402 may also include a housing 1408 that may include a transmitter 1410 and a receiver 1412 to allow transmission and reception of data between the apparatus 1402 and a remote location. The transmitter 1410 and receiver 1412 may be combined into single communication device (e.g., a transceiver 1414). An antenna 1416 may be attached to the housing 1408 and electrically coupled to the transceiver 1414. The apparatus 1402 may also include (not shown) multiple transmitters, multiple receivers, multiple transceivers, and/or multiple antennas. A transmitter 1410 and a receiver 1412 may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The transmitter 1410 may be configured to wirelessly transmit packets having different MAC header types. For example, the transmitter 1410 may be configured to transmit packets with different types of headers generated by the processing system 1404, discussed above.

The receiver 1412 may be configured to wirelessly receive packets having different MAC header type. In some aspects, the receiver 1412 is configured to detect a type of a MAC header used and process the packet accordingly.

The receiver 1412 may be used to detect and quantify the level of signals received by the transceiver 1414. The receiver 1412 may detect such signals as total energy, energy per subcarrier per symbol, power spectral density and other signals. The apparatus 1402 may also include a digital signal processor (DSP) 1420 for use in processing signals. The DSP 1420 may be configured to generate a data unit for transmission. In some aspects, the data unit may comprise a physical layer data unit (PPDU). In some aspects, the PPDU is referred to as a packet.

The apparatus 1402 may further comprise a user interface 1422 in some aspects. The user interface 1422 may comprise a keypad, a microphone, a speaker, and/or a display. The user interface 1422 may include any element or component that conveys information to a user of the apparatus 1402 and/or receives input from the user.

The various components of the apparatus 1402 may be coupled together by a bus system 1426. The bus system 1426 may include a data bus, for example, as well as a power bus, a control signal bus, and a status signal bus in addition to the data bus. Those of skill in the art will appreciate the components of the apparatus 1402 may be coupled together or accept or provide inputs to each other using some other mechanism.

Although a number of separate components are illustrated in FIG. 14, one or more of the components may be combined or commonly implemented. For example, the processing system 1404 may be used to implement not only the functionality described above with respect to the processing system 1404, but also to implement the functionality described above with respect to the transceiver 1414 and/or the DSP 1420. Further, each of the components illustrated in FIG. 14 may be implemented using a plurality of separate elements. Furthermore, the processing system 1404 may be used to implement any of the components, modules, circuits, or the like described below, or each may be implemented using a plurality of separate elements.

For ease of reference, when the apparatus 1402 is configured as a transmitting node, it is hereinafter referred to as an apparatus 1402*t*. Similarly, when the apparatus 1402 is configured as a receiving node, it is hereinafter referred to as an apparatus 1402*r*. A device in the wireless communication system 1300 may implement only functionality of a transmitting node, only functionality of a receiving node, or functionality of both a transmitting node and a receive node.

As discussed above, the apparatus 1402 may comprise an AP 1304 or a STA 1306, and may be used to transmit and/or receive communication having a plurality of MAC header types.

The components of FIG. 14 may be implemented in various ways. In some implementations, the components of FIG. 14 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 14 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 15:
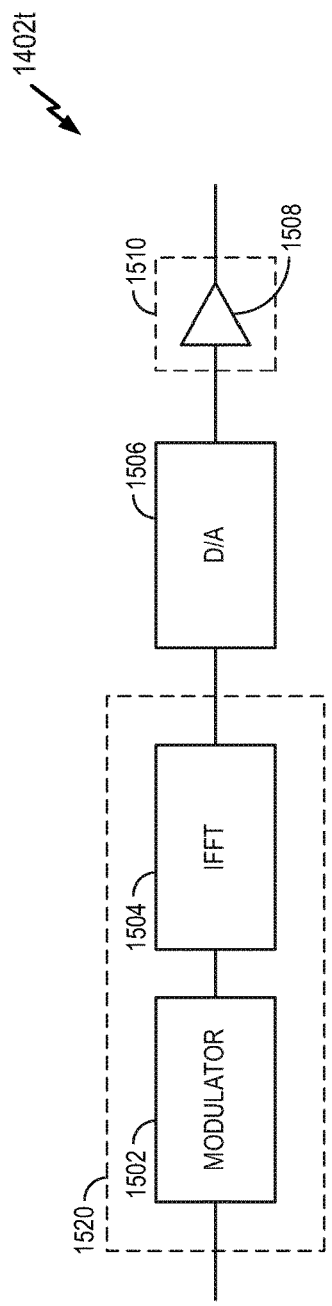
FIG. 15 is a functional block diagram of example components that may be utilized in the apparatus of FIG. 10 to transmit wireless communication.

As discussed above, the apparatus 1402 may comprise an AP 1304 or a STA 1306, a relay, or some other type of apparatus, and may be used to transmit and/or receive communication. FIG. 15 illustrates various components that may be utilized in the apparatus 1402*t* to transmit wireless communication. The components illustrated in FIG. 15 may be used, for example, to transmit OFDM communication. In some aspects, the components illustrated in FIG. 15 are used to generate and transmit packets to be sent over a bandwidth of less than or equal to 1 MHz.

The apparatus 1402t of FIG. 15 may comprise a modulator 1502 configured to modulate bits for transmission. For example, the modulator 1502 may determine a plurality of symbols from bits received from the processing system 1404 (FIG. 14) or the user interface 1422 (FIG. 14), for example by mapping bits to a plurality of symbols according to a constellation. The bits may correspond to user data or to control information. In some aspects, the bits are received in codewords. In one aspect, the modulator 1502 may comprise a QAM (quadrature amplitude modulation) modulator, for example, a 16-QAM modulator or a 64-QAM modulator. In other aspects, the modulator 1502 may comprise a binary phase-shift keying (BPSK) modulator, a quadrature phase-shift keying (QPSK) modulator, or an 8-PSK modulator.

The apparatus 1402t may further comprise a transform module 1504 configured to convert symbols or otherwise modulated bits from the modulator 1502 into a time domain. In FIG. 15, the transform module 1504 is illustrated as being implemented by an inverse fast Fourier transform (IFFT) module. In some implementations, there may be multiple transform modules (not shown) that transform units of data of different sizes. In some implementations, the transform module 1504 may be itself configured to transform units of data of different sizes. For example, the transform module 1504 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 1504 may be referred to as the size of the transform module 1504.

In FIG. 15, the modulator 1502 and the transform module 1504 are illustrated as being implemented in the DSP 1520. In some aspects, however, one or both of the modulator 1502 and the transform module 1504 are implemented in the processing system 1404 or in another element of the apparatus 1402t (e.g., see description above with reference to FIG. 14).

As discussed above, the DSP 1520 may be configured to generate a data unit for transmission. In some aspects, the modulator 1502 and the transform module 1504 may be configured to generate a data unit comprising a plurality of fields including control information and a plurality of data symbols.

Returning to the description of FIG. 15, the apparatus 1402t may further comprise a digital to analog converter 1506 configured to convert the output of the transform module into an analog signal. For example, the time-domain output of the transform module 1504 may be converted to a baseband OFDM signal by the digital to analog converter 1506. The digital to analog converter 1506 may be implemented in the processing system 1404 or in another element of the apparatus 1402 of FIG. 14. In some aspects, the digital to analog converter 1506 is implemented in the transceiver 1414 (FIG. 14) or in a data transmit processor.

The analog signal may be wirelessly transmitted by the transmitter 1510. The analog signal may be further processed before being transmitted by the transmitter 1510, for example by being filtered or by being upconverted to an intermediate or carrier frequency. In the aspect illustrated in FIG. 15, the transmitter 1510 includes a transmit amplifier 1508. Prior to being transmitted, the analog signal may be amplified by the transmit amplifier 1508. In some aspects, the amplifier 1508 may include a low noise amplifier (LNA).

The transmitter 1510 is configured to transmit one or more packets or data units in a wireless signal based on the analog signal. The data units may be generated using the processing system 1404 (FIG. 14) and/or the DSP 1520, for example using the modulator 1502 and the transform module 1504 as discussed above. Data units that may be generated and transmitted as discussed above are described in additional detail below.

Figure 16:
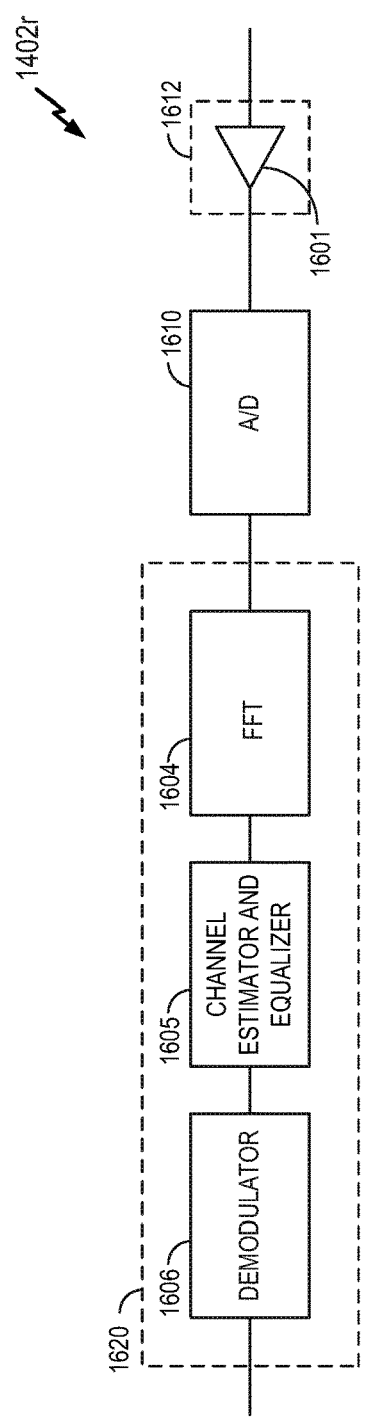
FIG. 16 is a functional block diagram of example components that may be utilized in the apparatus of FIG. 10 to receive wireless communication.

FIG. 16 illustrates various components that may be utilized in the apparatus 1402 of FIG. 14 to receive wireless communication. The components illustrated in FIG. 16 may be used, for example, to receive OFDM communication. For example, the components illustrated in FIG. 16 may be used to receive data units transmitted by the components discussed above with respect to FIG. 15.

The receiver 1612 of apparatus 1402r is configured to receive one or more packets or data units in a wireless signal. Data units that may be received and decoded or otherwise processed as discussed below.

In the aspect illustrated in FIG. 16, the receiver 1612 includes a receive amplifier 1601. The receive amplifier 1601 may be configured to amplify the wireless signal received by the receiver 1612. In some aspects, the receiver 1612 is configured to adjust the gain of the receive amplifier 1601 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 1601 may include an LNA.

The apparatus 1402r may comprise an analog to digital converter 1610 configured to convert the amplified wireless signal from the receiver 1612 into a digital representation thereof. Further to being amplified, the wireless signal may be processed before being converted by the analog to digital converter 1610, for example by being filtered or by being downconverted to an intermediate or baseband frequency. The analog to digital converter 1610 may be implemented in the processing system 1404 (FIG. 14) or in another element of the apparatus 1402r. In some aspects, the analog to digital converter 1610 is implemented in the transceiver 1414 (FIG. 14) or in a data receive processor.

The apparatus 1402r may further comprise a transform module 1604 configured to convert the representation of the wireless signal into a frequency spectrum. In FIG. 16, the transform module 1604 is illustrated as being implemented by a fast Fourier transform (FFT) module. In some aspects, the transform module may identify a symbol for each point that it uses. As described above with reference to FIG. 15, the transform module 1604 may be configured with a plurality of modes, and may use a different number of points to convert the signal in each mode. The number of points used by the transform module 1604 may be referred to as the size of the transform module 1604. In some aspects, the transform module 1604 may identify a symbol for each point that it uses.

The apparatus 1402r may further comprise a channel estimator and equalizer 1605 configured to form an estimate of the channel over which the data unit is received, and to remove certain effects of the channel based on the channel estimate. For example, the channel estimator and equalizer 1605 may be configured to approximate a function of the channel, and the channel equalizer may be configured to apply an inverse of that function to the data in the frequency spectrum.

The apparatus 1402*r* may further comprise a demodulator 1606 configured to demodulate the equalized data. For example, the demodulator 1606 may determine a plurality of bits from symbols output by the transform module 1604 and the channel estimator and equalizer 1605, for example by reversing a mapping of bits to a symbol in a constellation. The bits may be processed or evaluated by the processing system 1404 (FIG. 14), or used to display or otherwise output information to the user interface 1422 (FIG. 14). In this way, data and/or information may be decoded. In some aspects, the bits correspond to codewords. In one aspect, the demodulator 1606 may include a QAM (quadrature amplitude modulation) demodulator, for example an 8-QAM demodulator or a 64-QAM demodulator. In other aspects, the demodulator 1606 may include a binary phase-shift keying (BPSK) demodulator or a quadrature phase-shift keying (QPSK) demodulator.

In FIG. 16, the transform module 1604, the channel estimator and equalizer 1605, and the demodulator 1606 are illustrated as being implemented in the DSP 1620. In some aspects, however, one or more of the transform module 1604, the channel estimator and equalizer 1605, and the demodulator 1606 are implemented in the processing system 1404 (FIG. 14) or in another element of the apparatus 1402 (FIG. 14).

As discussed above, the wireless signal received at the receiver 1412 may include one or more data units. Using the functions or components described above, the data units or data symbols therein may be decoded evaluated or otherwise evaluated or processed. For example, the processing system 1404 (FIG. 14) and/or the DSP 1620 may be used to decode data symbols in the data units using the transform module 1604, the channel estimator and equalizer 1605, and the demodulator 1606.

Data units exchanged by the AP 1304 and the STA 1306 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 1402*t* shown in FIG. 15 is an example of a single transmit chain used for transmitting via an antenna. The apparatus 1402*r* shown in FIG. 16 is an example of a single receive chain used for receiving via an antenna. In some implementations, the apparatus 1402*t* or 1402*r* may implement a portion of a MIMO system using multiple antennas to simultaneously transmit data.

The wireless communication system 1300 may employ methods to allow efficient access of the wireless medium based on unpredictable data transmissions while avoiding collisions. As such, in accordance with various aspects, the wireless communication system 1300 performs carrier sense multiple access/collision avoidance (CSMA/CA) that may be referred to as the Distributed Coordination Function (DCF). More generally, an apparatus 1402 having data for transmission senses the wireless medium to determine if the channel is already occupied. If the apparatus 1402 senses the channel is idle, then the apparatus 1402 transmits prepared data. Otherwise, the apparatus 1402 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus may include a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may comprise an access point, a relay, or an access terminal.

An access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may comprise, be implemented as, or known as a relay node, a relay device, a relay station, a relay apparatus, or some other similar terminology. As discussed above, in some aspects, a relay may comprise some access terminal functionality and some access point functionality.

In some aspects, a wireless apparatus may include an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3$^{rd}$ Generation Partnership Project" (3GPP), while cdma2000 is described in documents from an organization named "3$^{rd}$ Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

Example Communication Device

Figure 17:
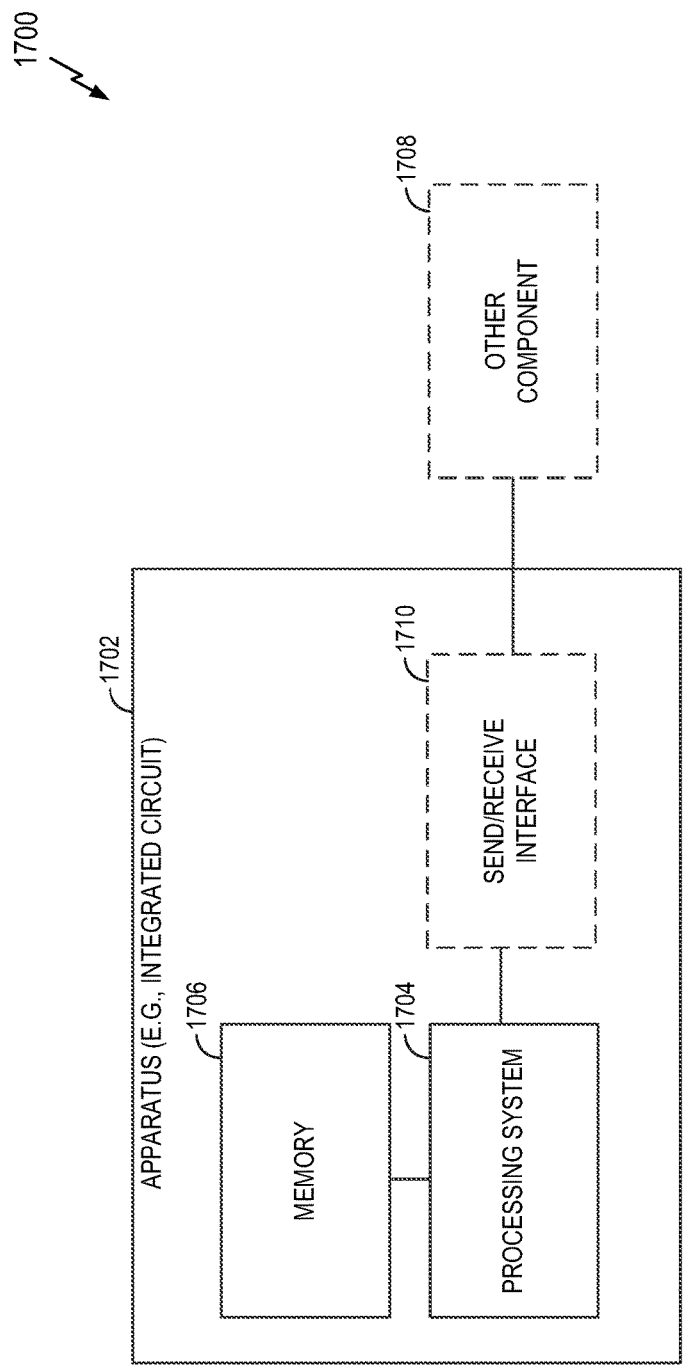
FIG. 17 is a functional block diagram of an example apparatus in accordance with some aspects of the disclosure.

FIG. 17 illustrates an example apparatus 1700 (e.g., an AP, an AT, or some other type of wireless communication node) according to certain aspects of the disclosure. The apparatus 1700 includes an apparatus 1702 (e.g., an integrated circuit) and, optionally, at least one other component 1708. In some aspects, the apparatus 1702 may be configured to operate in a wireless communication node (e.g., an AP or an AT) and to perform one or more of the operations described herein. For convenience, a wireless communication node may be referred to herein as a wireless node. The apparatus 1702 includes a processing system 1704, and a memory 1706 coupled to the processing system 1704. Example implementations of the processing system 1704 are provided herein. In some aspects, the processing system 1704 and the memory 1706 of FIG. 17 may correspond to the processing system 1404 and the memory component 1406 of FIG. 14.

The processing system 1704 is generally adapted for processing, including the execution of such programming stored on the memory 1706. For example, the memory 1706 may store instructions that, when executed by the processing system 1704, cause the processing system 1704 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 1702 communicates with another component 1708 (i.e., a component external to the apparatus 1702) of the apparatus 1700. To this end, in some implementations, the apparatus 1702 may include a send/receive interface 1710 (e.g., an interface bus, bus drivers, bus receivers, or other suitable circuitry) coupled to the processing system 1704 for sending information (e.g., received information, decoded information, messages, etc.) between the processing system 1704 and the other component 1708. In some implementations, the interface 1710 may be configured to interface the processing system 1704 to one or more other components (e.g., a radio frequency (RF) front end (e.g., a transmitter and/or a receiver)) of the apparatus 1700 (other components not shown in FIG. 17).

The apparatus 1702 may communicate with other apparatuses in various ways. In cases where the apparatus 1702 include an RF transceiver (not shown in FIG. 17), the apparatus may transmit and receive information (e.g. a frame, a message, bits, etc.) via RF signaling. In some cases, rather than transmitting information via RF signaling, the apparatus 1702 may have an interface to provide (e.g., output, send, transmit, etc.) information for RF transmission. For example, the processing system 1704 may output information, via a bus interface, to an RF front end for RF transmission. Similarly, rather than receiving information via RF signaling, the apparatus 1702 may have an interface to obtain information that is received by another apparatus. For example, the processing system 1704 may obtain (e.g., receive) information, via a bus interface, from an RF receiver that received the information via RF signaling.

Example Processes

Figure 18:
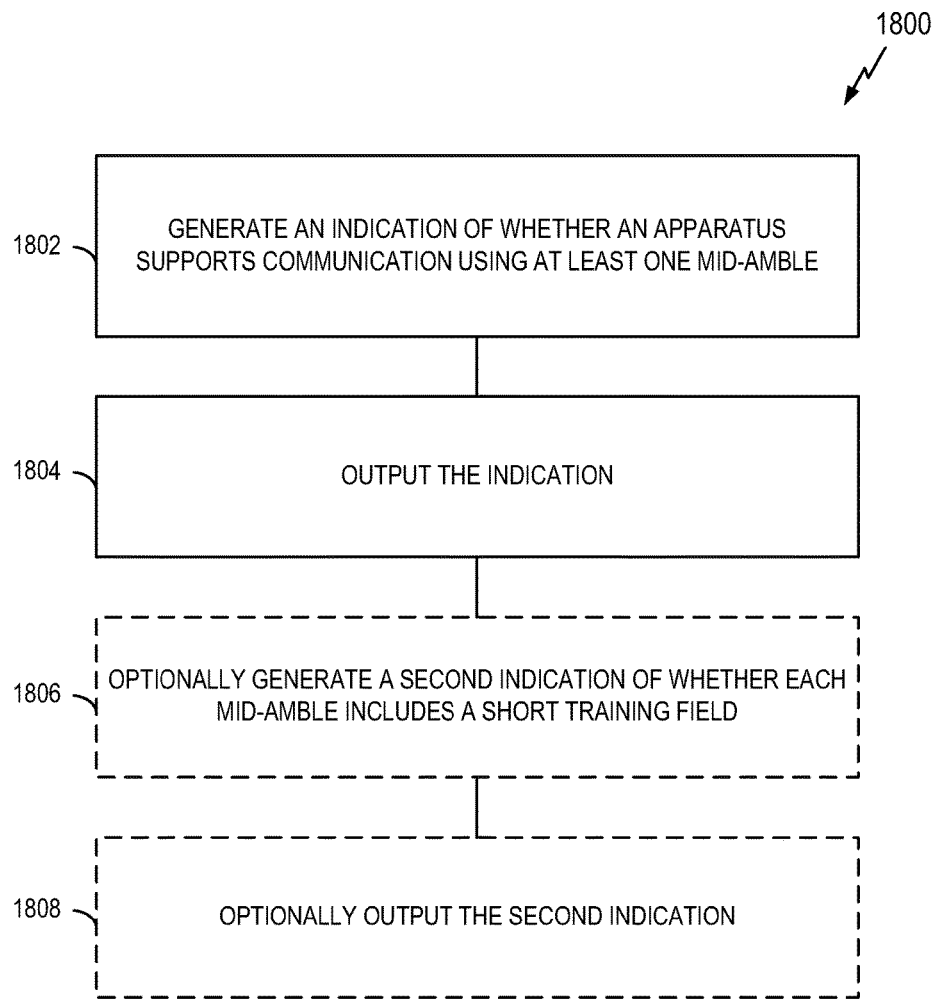
FIG. 18 is a flow diagram of an example process in accordance with some aspects of the disclosure.

FIG. 18 illustrates a process 1800 for communication in accordance with some aspects of the disclosure. The process 1800 may take place within a processing system (e.g., the processing system 1704 of FIG. 17), which may be located in an AP, an AT, or some other suitable apparatus. Of course, in various aspects within the scope of the disclosure, the process 1800 may be implemented by any suitable apparatus capable of supporting communication-related operations.

At block 1802, an apparatus (e.g., a chip or a transmitting wireless node) generates an indication of whether the apparatus supports communication using at least one mid-ambles. In some aspects, each mid-amble may include channel estimation information, gain setting information, or any combination thereof.

In some aspects, the communication using at least one mid-amble may include obtaining data units that include at least one mid-amble. In some aspects, the communication using at least one mid-amble may include generating data units that include at least one mid-amble and outputting the data units for transmission.

In some aspects, the generation of the indication may include generating at least one of: an information element, a management frame, a beacon, a probe request, a probe response, an association request, an association response, or any combination thereof including the indication therein. In this case, the indication is output for transmission via at least one of: the information element, the management frame, the beacon, the probe request, the probe response, the association request, the association response, or any combination thereof.

In some aspects, the generation of the indication may include determining a mobility state of the apparatus and specifying a value for the indication according to the mobility state.

In some aspects, the indication applies to all data units to be generated and output for transmission by the apparatus. In some aspects, each data unit may include an IEEE 802.11ax frame. In some aspects, each data unit may include a Physical Layer Convergence Protocol (PLCP) Protocol Data Unit.

At block 1804, the apparatus outputs the indication. For example, a chip may output the indication for transmission (e.g., by a transmitter). As another example, a wireless node may transmit the indication.

At optional block 1806, the apparatus may generate a second indication of whether each mid-amble includes a short training field.

At optional block 1808, the apparatus may output the second indication. For example, a chip may output the second indication for transmission (e.g., by a transmitter). As another example, a wireless node may transmit the second indication.

Figure 21:
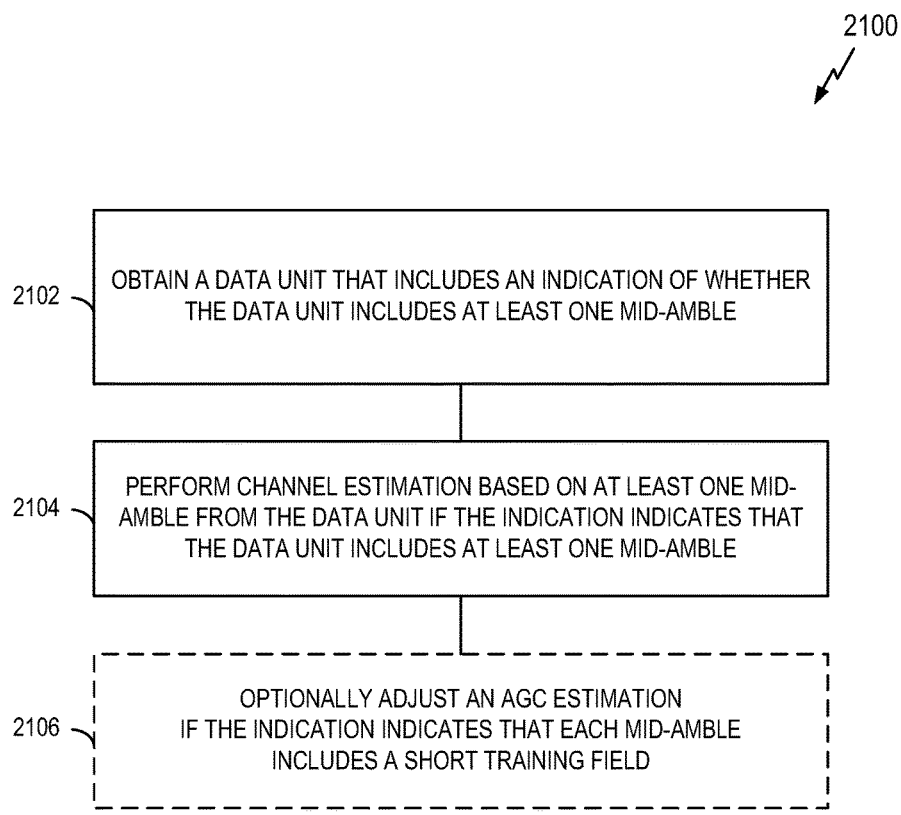
FIG. 21 is a flow diagram of an example process in accordance with some aspects of the disclosure.

FIG. 21 illustrates a process 2100 for communication in accordance with some aspects of the disclosure. The process 2100 may take place within a processing system (e.g., the processing system 1704 of FIG. 17), which may be located in an AP, an AT, or some other suitable apparatus. Of course, in various aspects within the scope of the disclosure, the process 2100 may be implemented by any suitable apparatus capable of supporting communication-related operations.

At block 2102, an apparatus (e.g., chip of a receiving wireless node) obtains an indication of whether another apparatus supports communication using at least one mid-amble. For example, a chip may obtain the indication (e.g., from a receiver). As another example, a wireless node may receive the indication. In some aspects, the indication is obtained via at least one of: an information element, a management frame, a beacon, a probe request, a probe response, an association request, an association response, or any combination thereof. In some aspects, each mid-amble may include channel estimation information, gain setting information, or any combination thereof.

In some aspects, the communication using at least one mid-amble may include obtaining the data units comprising at least one mid-amble. In some aspects, the communication using at least one mid-amble may include outputting the data units comprising at least one mid-amble for transmission.

In some aspects, the indication applies to all data units obtained from the other apparatus. In some aspects, each data unit may include an IEEE 802.11ax frame. In some aspects, each data unit may include a Physical Layer Convergence Protocol (PLCP) Protocol Data Unit.

At block 2104, the apparatus processes data units including at least one mid-amble if the indication indicates that the other apparatus supports communication using at least one mid-amble.

At optional block 2106, the apparatus may receive a second indication of whether each mid-amble includes a short training field. For example, a chip may obtain the second indication (e.g., from a receiver). As another example, a wireless node may receive the second indication.

At optional block 2108, the apparatus may adjust an automatic gain control (AGC) estimation based on a short training field for each mid-amble if the indication indicates that each mid-amble includes a short training field.

Figure 20:
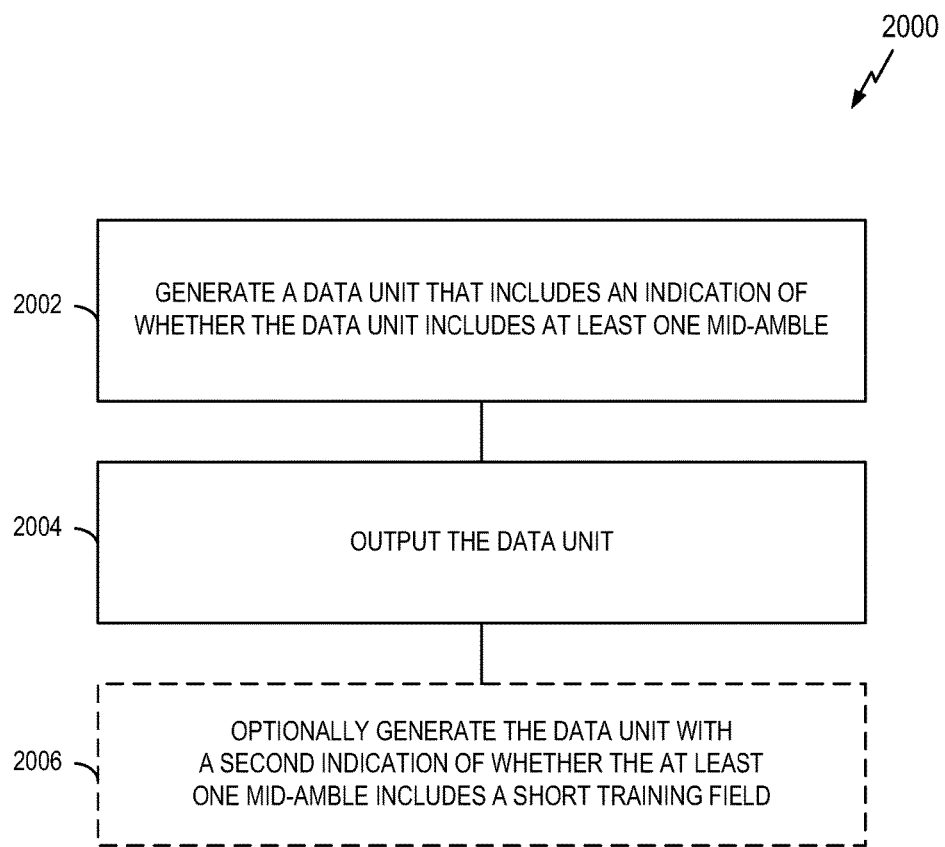
FIG. 20 is a flow diagram of an example process in accordance with some aspects of the disclosure.

FIG. 20 illustrates a process 2000 for communication in accordance with some aspects of the disclosure. The process 2000 may take place within a processing system (e.g., the processing system 1704 of FIG. 17), which may be located in an AP, an AT, or some other suitable apparatus. Of course, in various aspects within the scope of the disclosure, the process 2000 may be implemented by any suitable apparatus capable of supporting communication-related operations.

At block 2002, an apparatus (e.g., a chip or a transmitting wireless node) generates a data unit that includes an indication of whether the data unit includes at least one mid-amble. In some aspects, the at least one mid-amble is between data symbols of the data unit. In some aspects, each mid-amble may include channel estimation information, gain setting information, or any combination thereof.

The indication may be generated in various ways. In some aspects, the indication is included in an IEEE 802.11ax Doppler bit of the data unit. In some aspects, the indication is included in an IEEE 802.11ax HE-SIG-A field of the data unit.

The data unit may take various forms. In some aspects, the data unit may include an IEEE 802.11ax frame. In some aspects, the data unit may include a Physical Layer Convergence Protocol (PLCP) Protocol Data Unit.

At block 2004, the apparatus outputs the data unit. For example, a chip may output the data unit for transmission (e.g., by a transmitter). As another example, a wireless node may transmit the data unit.

At optional block 2006, the apparatus may generate the data unit with a second indication of whether the at least one mid-amble includes a short training field.

FIG. 21 illustrates a process 2100 for communication in accordance with some aspects of the disclosure. The process 2100 may take place within a processing system (e.g., the processing system 1704 of FIG. 17), which may be located in an AP, an AT, or some other suitable apparatus. Of course, in various aspects within the scope of the disclosure, the process 2100 may be implemented by any suitable apparatus capable of supporting communication-related operations.

At block 2102, an apparatus (e.g., a chip or a receiving wireless node) obtains a data unit that includes an indication of whether the data unit includes at least one mid-amble. For example, a chip may obtain the data unit (e.g., from a receiver). As another example, a wireless node may receive the data unit. In some aspects, each mid-amble is between data symbols of the data unit. In some aspects, each mid-amble may include channel estimation information, gain setting information, or any combination thereof.

The indication may be obtained in various ways. In some aspects, the indication may include an IEEE 802.11ax Doppler bit of the data unit. In some aspects, the indication may include an IEEE 802.11ax HE-SIG-A field of the data unit.

The data unit may take various forms. In some aspects, the data unit may include an IEEE 802.11ax frame. In some aspects, the data unit may include a Physical Layer Convergence Protocol (PLCP) Protocol Data Unit.

At block 2104, the apparatus performs channel estimation based on at least one mid-amble from the data unit if the indication indicates that the data unit includes at least one mid-amble.

In some aspects, the data unit further may include a second indication of whether each mid-amble includes a short training field. At optional block 2106, the apparatus may adjust an automatic gain control (AGC) estimation for the data unit if the second indication indicates that each mid-amble includes a short training field.

Figure 22:
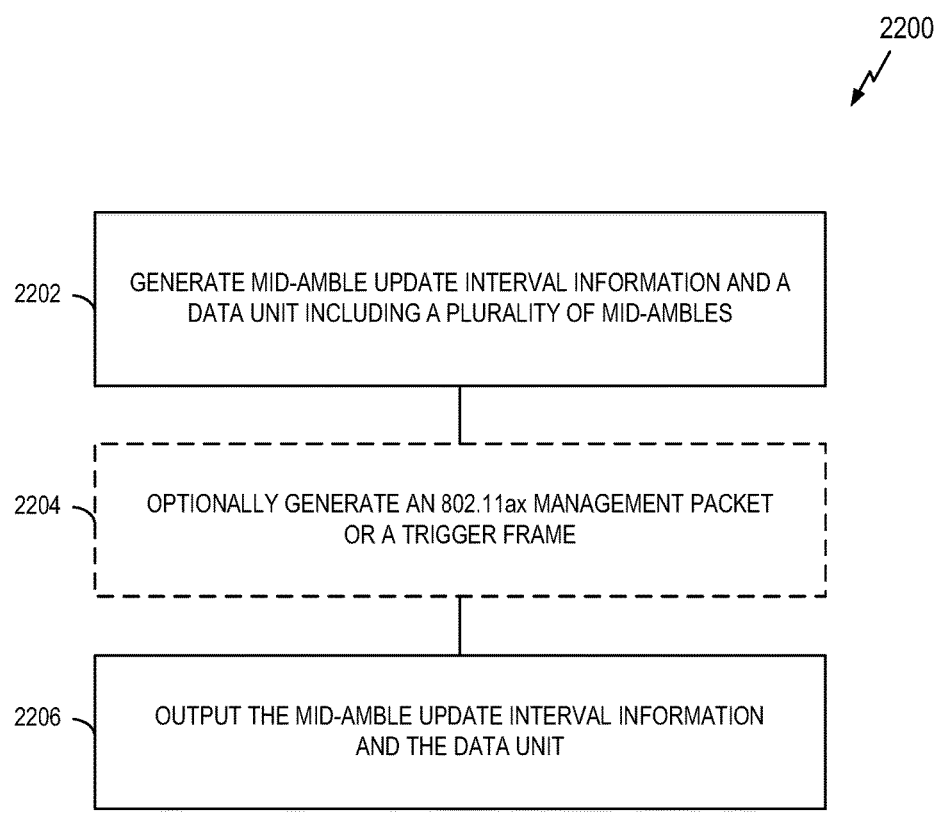
FIG. 22 is a flow diagram of an example process in accordance with some aspects of the disclosure.

FIG. 22 illustrates a process 2200 for communication in accordance with some aspects of the disclosure. The process 2200 may take place within a processing system (e.g., the processing system 1704 of FIG. 17), which may be located in an AP, an AT, or some other suitable apparatus. Of course, in various aspects within the scope of the disclosure, the process 2200 may be implemented by any suitable apparatus capable of supporting communication-related operations.

At block 2202, an apparatus (e.g., chip or a transmitting wireless node) generates mid-amble update interval information and a data unit including a plurality of mid-ambles. In some aspects, each mid-amble may include channel estimation information, gain setting information, or any combination thereof.

In some aspects, the mid-amble update interval information specifies different mid-amble update intervals associated with different communication parameters. In some aspects, the different communication parameters comprise at least one of: different modulation and coding schemes (MCSs), different numbers of spatial streams, different bandwidth, or any combination thereof.

In some aspects, the mid-amble update interval information specifies ratios between different mid-amble update intervals. In some aspects, the mid-amble update interval information specifies different mid-amble update intervals for different wireless nodes.

In some aspects, the mid-amble update interval information may be included in the preamble of a packet (e.g., the packet that carries a data unit). For example, the generation of the mid-amble update interval information (and, in some aspects, a data unit) may involve including the mid-amble update interval information in an Nsts field of the preamble, in an IEEE 802.11 HE-SIG-A field of the preamble of the packet, or in an HE-SIG-B field of the preamble of the packet. In some aspects, the generation of the mid-amble update interval information includes generating a Trigger frame having the mid-amble update interval information therein, wherein the mid-amble update interval information is output for transmission via the Trigger frame. In some aspects, the generation of the mid-amble update interval information comprises generating a packet including a preamble, wherein the preamble includes an Nsts field having the mid-amble update interval information therein, and wherein the mid-amble update interval information is output for transmission via the packet. In some aspects, the generation of the mid-amble update interval information comprises generating a packet including a preamble, wherein the preamble includes an IEEE 802.11 HE-SIG-A field having the mid-amble update interval information therein, and wherein the mid-amble update interval information is output for transmission via the packet. In some aspects, the generation of the mid-amble update interval information comprises generating a packet including a preamble, wherein the preamble includes an IEEE 802.11 HE-SIG-B field having the mid-amble update interval information therein, and wherein the mid-amble update interval information is output for transmission via the packet.

At optional block 2204, the apparatus may generate an 802.11ax management packet or a Trigger frame.

At block 2206, the apparatus outputs the mid-amble update interval information and the data unit. For example, a chip may output the information for transmission (e.g., by a transmitter). As another example, a wireless node may transmit the information. In a scenario where the apparatus generates an 802.11ax management packet at block 2204, the mid-amble update interval information may be output for transmission via the 802.11ax management packet. In a scenario where the apparatus generates a Trigger frame at block 2204, the mid-amble update interval information may be output for transmission via the Trigger frame. Thus, in some aspects, the outputting of the mid-amble update interval information and the data unit for transmission may include outputting a packet for transmission (e.g., a packet for a data unit, a management packet, a Trigger packet, etc.).

The data unit may take various forms. In some aspects, the data unit may include an IEEE 802.11ax frame. In some aspects, the data unit may include a Physical Layer Convergence Protocol (PLCP) Protocol Data Unit.

Figure 23:
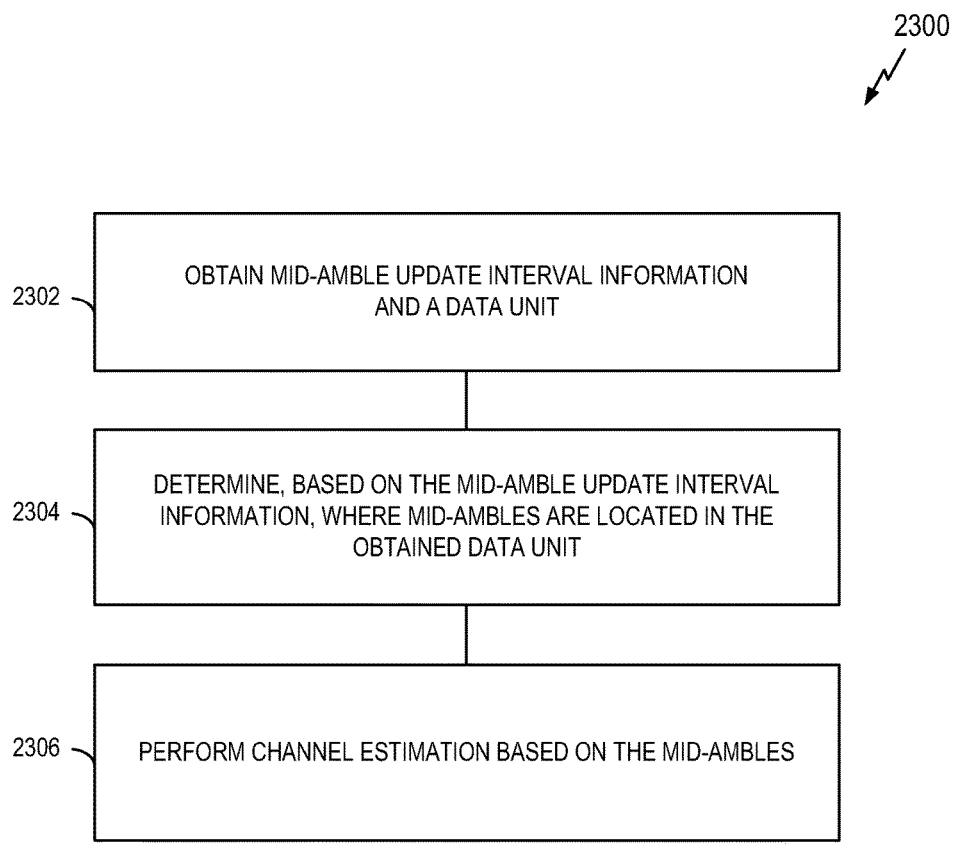
FIG. 23 is a flow diagram of an example process in accordance with some aspects of the disclosure.
Figure 24:
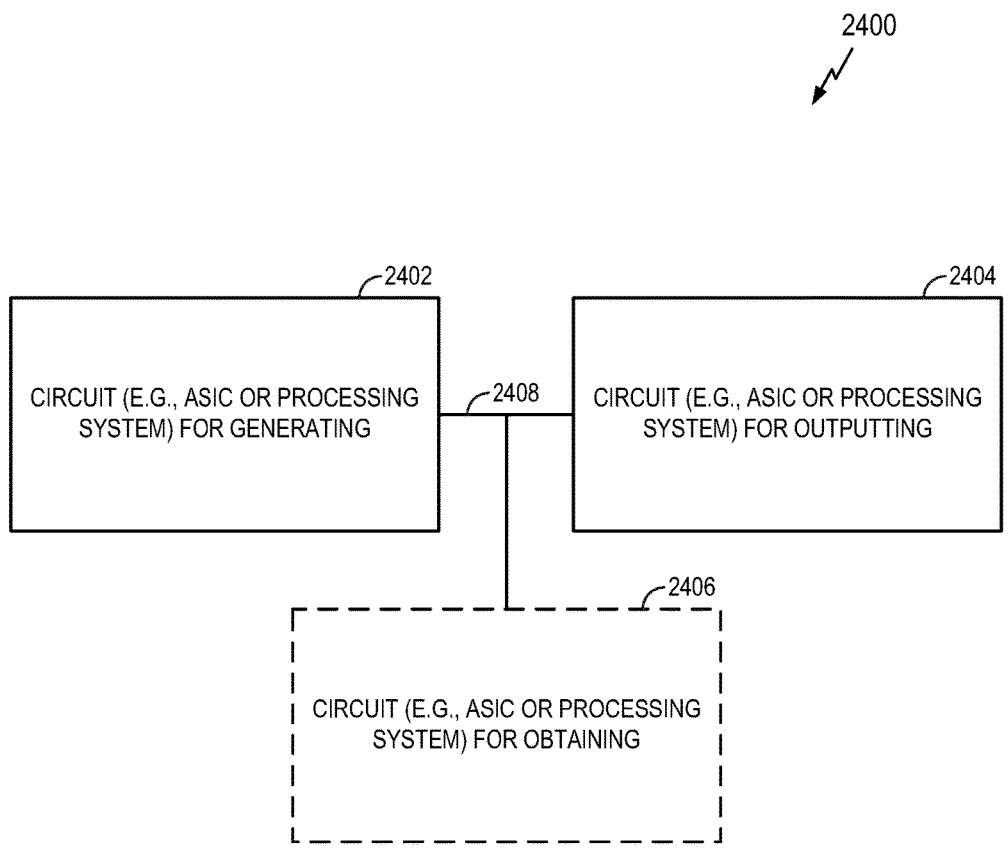
FIG. 24 is a simplified block diagram of several sample aspects of an apparatus configured with functionality in accordance with some aspects of the disclosure.
Figure 25:
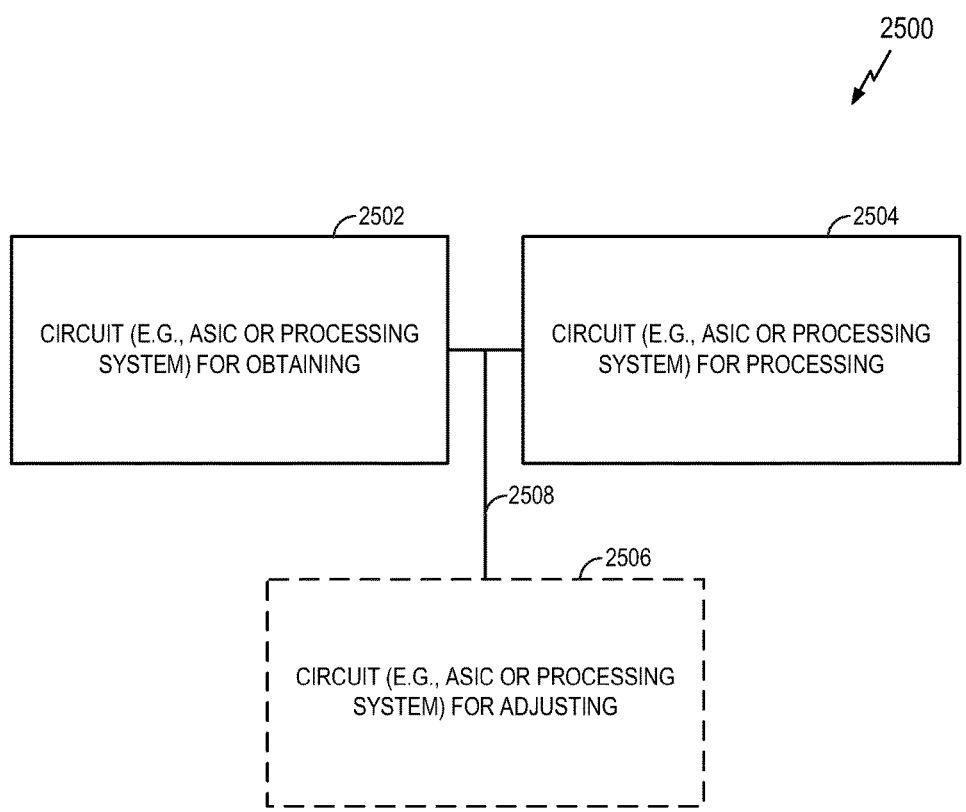
FIG. 25 is a simplified block diagram of several sample aspects of another apparatus configured with functionality in accordance with some aspects of the disclosure.
Figure 26:
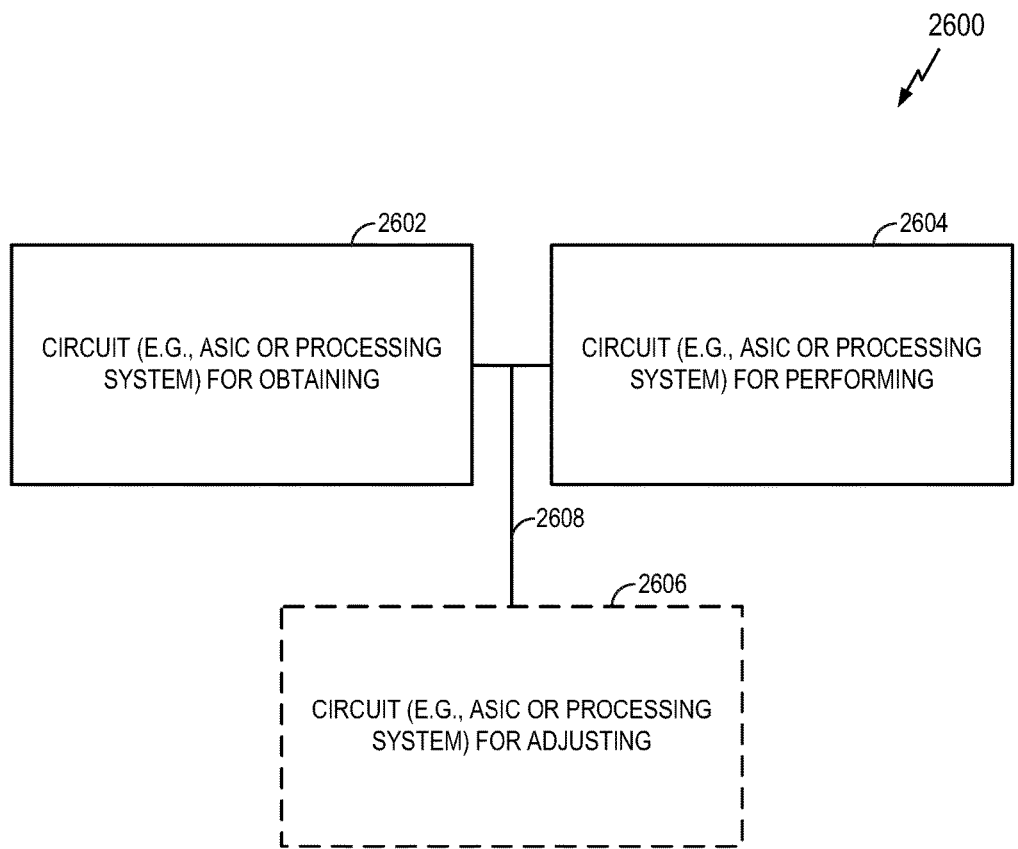
FIG. 26 is a simplified block diagram of several sample aspects of another apparatus configured with functionality in accordance with some aspects of the disclosure.
Figure 27:
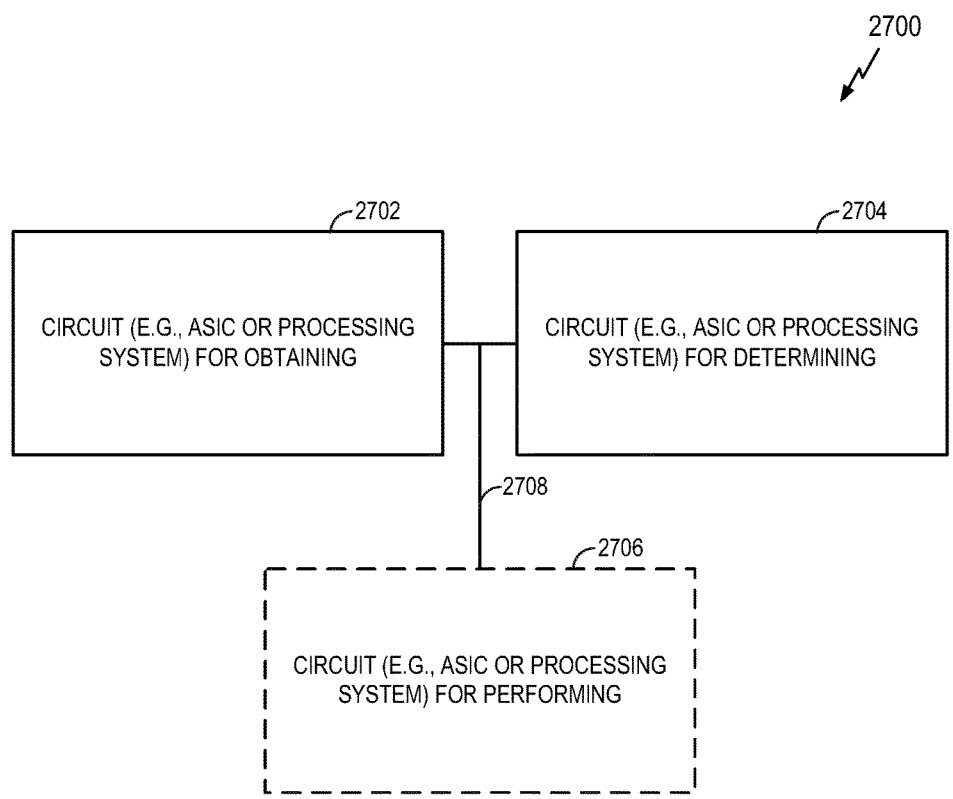
FIG. 27 is a simplified block diagram of several sample aspects of another apparatus configured with functionality in accordance with some aspects of the disclosure.

FIG. 23 illustrates a process 2300 for communication in accordance with some aspects of the disclosure. The process 2300 may take place within a processing system (e.g., the processing system 1704 of FIG. 17), which may be located in an AP, an AT, or some other suitable apparatus. Of course, in various aspects within the scope of the disclosure, the process 2300 may be implemented by any suitable apparatus capable of supporting communication-related operations.

At block 2302, an apparatus (e.g., a chip or a receiving wireless node) obtains mid-amble update interval information and a data unit. For example, a chip may obtain the information (e.g., from a receiver). As another example, a wireless node may receive the information.

In some aspects, the mid-amble update interval information specifies different mid-amble update intervals associated with different communication parameters. In some aspects, the different communication parameters comprise at least one of: different modulation and coding schemes (MCSs), different numbers of spatial streams, different bandwidth, or any combination thereof.

In some aspects, the mid-amble update interval information specifies ratios between different mid-amble update intervals. In some aspects, the mid-amble update interval information specifies different mid-amble update intervals for different wireless nodes. In some aspects, the mid-amble update interval information is obtained via an 802.11ax management packet.

In some aspects, the mid-amble update interval information may be included in the preamble of a packet (e.g., the packet that carries a data unit). For example, the mid-amble update interval information may be included in an Nsts field of the preamble, in an IEEE 802.11 HE-SIG-A field of the preamble of the packet, or in an HE-SIG-B field of the preamble of the packet. In some aspects, the obtaining of the mid-amble update interval information comprises obtaining a packet including a preamble, wherein the preamble includes an Nsts field having the mid-amble update interval information therein. In some aspects, the obtaining of the mid-amble update interval information comprises obtaining a packet including a preamble, wherein the preamble includes an IEEE 802.11 HE-SIG-A field having the mid-amble update interval information therein. In some aspects, the obtaining of the mid-amble update interval information comprises obtaining a packet including a preamble, wherein the preamble includes an IEEE 802.11 HE-SIG-B field having the mid-amble update interval information therein.

In some aspects, the mid-amble update interval information may be included in a data unit. For example, the mid-amble update interval information may be included in a Trigger frame. Accordingly, in some aspects, the obtaining of the mid-amble update interval information may include obtaining a Trigger frame having the mid-amble update interval information therein. Thus, in some aspects, the obtaining of the mid-amble update interval information and the data unit may include obtaining a packet (e.g., a packet that includes the data unit or a Trigger packet).

At block 2304, the apparatus determines, based on the mid-amble update interval information, where mid-ambles are located in the received data unit. In some aspects, each mid-amble may include channel estimation information, gain setting information, or any combination thereof.

At block 2306, the apparatus performs channel estimation based on the mid-ambles.

The data unit may take various forms. In some aspects, the data unit may include an IEEE 802.11ax frame. In some aspects, the data unit may include a Physical Layer Convergence Protocol (PLCP) Protocol Data Unit.

Example Apparatus

The components described herein may be implemented in a variety of ways. Referring to FIGS. 24-27, apparatuses 2400, 2500, 2600, and 2700 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 2400 includes one or more components (modules) that may perform one or more of the functions described herein with regard to various figures. For example, a circuit (e.g., an ASIC or processing system) for generating 2402, e.g., a means for generating, may correspond to, for example, a processing system as discussed herein. A circuit (e.g., an ASIC or processing system) for outputting 2404, e.g., a means for outputting, may correspond to, for example, an interface (e.g., a bus interface, a send/receive interface, or some other type of signal interface), a communication device, a transceiver, a transmitter, or some other similar component as discussed herein. An optional circuit (e.g., an ASIC or processing system) for obtaining 2406, e.g., a means for obtaining, may correspond to, for example, an interface (e.g., a bus interface, a send/receive interface, or some other type of signal interface), a communication device, a transceiver, a receiver, or some other similar component as discussed herein. Two or more of the modules of FIG. 24 may communicate with each other or some other component via a signaling bus 2408. In various implementations, the processing system 1404 of FIG. 14 and/or the processing system 1704 of FIG. 17 may include one or more of the circuit for generating 2402, the circuit for outputting 2404, or the circuit for obtaining 2404.

The apparatus 2500 includes one or more components (modules) that may perform one or more of the functions described herein with regard to various figures. For example, a circuit (e.g., an ASIC or processing system) for obtaining 2502, e.g., a means for obtaining, may correspond to, for example, an interface (e.g., a bus interface, a send/receive interface, or some other type of signal interface), a communication device, a transceiver, a receiver, or some other similar component as discussed herein. A circuit (e.g., an ASIC or processing system) for processing 2504, e.g., a means for processing, may correspond to, for example, a processing system as discussed herein. An optional circuit (e.g., an ASIC or processing system) for adjusting 2506, e.g., a means for adjusting, may correspond to, for example, a processing system as discussed herein. Two or more of the modules of FIG. 25 may communicate with each other or some other component via a signaling bus 2508. In various implementations, the processing system 1404 of FIG. 14 and/or the processing system 1704 of FIG. 17 may include one or more of the circuit for obtaining 2502, the circuit for processing 2504, or the circuit for adjusting 2504.

The apparatus 2600 includes one or more components (modules) that may perform one or more of the functions described herein with regard to various figures. For example, a circuit (e.g., an ASIC or processing system) for obtaining 2602, e.g., a means for obtaining, may correspond to, for example, an interface (e.g., a bus interface, a send/receive interface, or some other type of signal interface), a communication device, a transceiver, a receiver, or some other similar component as discussed herein. A circuit (e.g., an ASIC or processing system) for performing 2604, e.g., a means for performing, may correspond to, for example, a processing system as discussed herein. An optional circuit (e.g., an ASIC or processing system) for adjusting 2606, e.g., a means for adjusting, may correspond to, for example, a processing system as discussed herein. Two or more of the modules of FIG. 26 may communicate with each other or some other component via a signaling bus 2608. In various implementations, the processing system 1404 of FIG. 14 and/or the processing system 1704 of FIG. 17 may include one or more of the circuit for obtaining 2602, the circuit for performing 2604, or the circuit for adjusting 2604.

The apparatus 2700 includes one or more components (modules) that may perform one or more of the functions described herein with regard to various figures. For example, a circuit (e.g., an ASIC or processing system) for obtaining 2702, e.g., a means for obtaining, may correspond to, for example, an interface (e.g., a bus interface, a send/receive interface, or some other type of signal interface), a communication device, a transceiver, a receiver, or some other similar component as discussed herein. A circuit (e.g., an ASIC or processing system) for determining 2704, e.g., a means for determining, may correspond to, for example, a processing system as discussed herein. A circuit (e.g., an ASIC or processing system) for performing 2706, e.g., a means for performing, may correspond to, for example, a processing system as discussed herein. Two or more of the modules of FIG. 27 may communicate with each other or some other component via a signaling bus 2708. In various implementations, the processing system 1404 of FIG. 14 and/or the processing system 1704 of FIG. 17 may include one or more of the circuit for obtaining 2702, the circuit for determining 2704, or the circuit for performing 2704.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes are optional.

As noted above, the apparatuses 2400, 2500, 2600, and 2700 may include (e.g., may be) one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 2400 may be a single device (e.g., with components 2402 and 2404 implemented as different sections of an ASIC). As another specific example, the apparatus 2400 may comprise several devices (e.g., with the component 2402 implemented as one ASIC, and the component 2404 implemented as another ASIC).

In addition, the components and functions represented by FIGS. 24-27 as well as other components and functions described herein, may be implemented using any suitable means. Such means are implemented, at least in part, using corresponding structure as taught herein. For example, the components described above in conjunction with the "ASIC for" components of FIGS. 24-27 correspond to similarly designated "means for" functionality. Thus, one or more of such means is implemented using one or more of processor components, integrated circuits, or other suitable structure as taught herein in some implementations. Several examples follow. A means for generating (e.g., an indication, a data unit, interval information, a packet, or a trigger frame) may obtain information used for the generation (e.g., from a memory device or some other component), formulate the desired information, output the formulated information (e.g., to a memory device or some other component), and perform other related operations as described herein. A means for outputting (e.g., an indication, a data unit, interval information, a packet, or a trigger frame) may obtain information to be output (e.g., from a memory device or some other component), format the information if needed, send the information to an appropriate destination (e.g., a memory device, a transmitter, some other component, or some other apparatus), and perform other related operations as described herein. A means for obtaining (e.g., an indication, a data unit, interval information, a packet, or a trigger frame) may determine where to obtain information (e.g., from a memory device, a receiver, some other component, or some other apparatus), process the information if needed, and output the information to an appropriate destination (e.g., a memory device, or some other component), and perform other related operations as described herein. A means for processing (e.g., a data unit, a packet, or a trigger frame) may obtain information to be processed and an indication that controls the processing (e.g., from a memory device or some other component), operate on the information (e.g., according to the indication), output the result of the operation (e.g., to a memory device or some other component), and perform other related operations as described herein. A means for adjusting (e.g., an AGC estimation) may obtain information to be adjusted and an indication that controls the adjustment (e.g., from a memory device or some other component), modify the information (e.g., according to the indication), output the result of the modification (e.g., to a memory device or some other component), and perform other related operations as described herein. A means for performing (e.g., channel estimation) may obtain information (e.g., a mid-amble) and an indication that controls the operation (e.g., from a memory device or some other component), operate on the information (e.g., generate an estimate according to the indication), output the result of the operation (e.g., to a memory device or some other component), and perform other related operations as described herein. A means for determining (e.g., where mid-ambles are located) may obtain information (e.g., obtain mid-amble update interval information and a data unit from a memory device or some other component), operate on the information, output the result of the determination (e.g., to a memory device or some other component), and perform other related operations as described herein.

Figure 19:
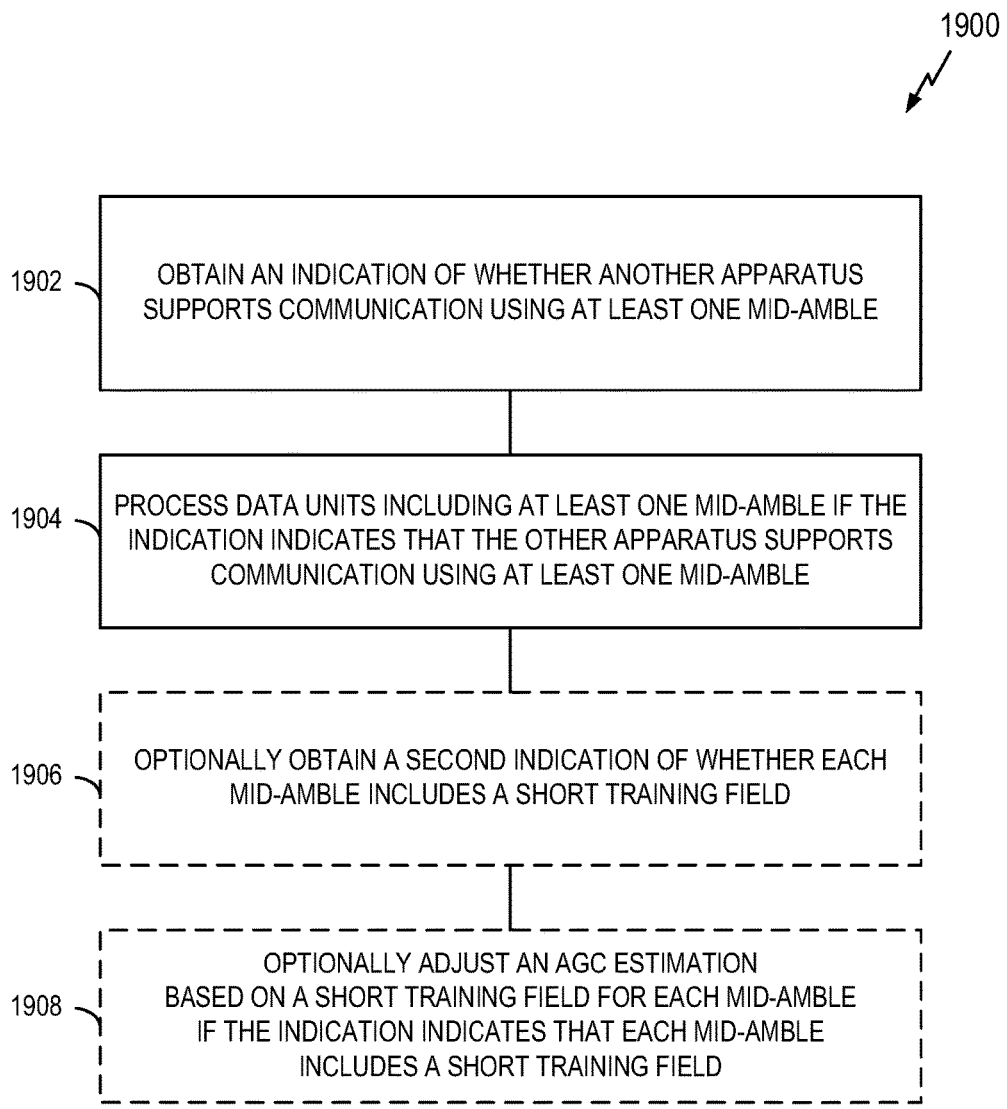
FIG. 19 is a flow diagram of an example process in accordance with some aspects of the disclosure.

The various operations of methods described herein may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar functionality and/or numbering. For example, the blocks of the processes 1800, 2000, or 2200 illustrated in FIGS. 18, 20, or 22 may correspond at least in some aspects, to corresponding blocks of the apparatus 2400 illustrated in FIG. 24. As another example, the blocks of the process 1900 illustrated in FIG. 19 may correspond at least in some aspects, to corresponding blocks of the apparatus 2500 illustrated in FIG. 25. As yet another example, the blocks of the process 2100 illustrated in FIG. 21 may correspond at least in some aspects, to corresponding blocks of the apparatus 2600 illustrated in FIG. 26. Also, the blocks of the process 2300 illustrated in FIG. 23 may correspond at least in some aspects, to corresponding blocks of the apparatus 2700 illustrated in FIG. 27.

Example Programming

Referring to FIGS. 28-31, programming stored by a memory 2800, a memory 2900, a memory 3000, or a memory 3100 (e.g. a storage medium, a memory device, etc.), when executed by a processing system (e.g., the processing system 1704 of FIG. 17), causes the processing system to perform one or more of the various functions and/or process operations described herein. For example, the programming, when executed by the processing system 1704, may cause the processing system 1704 to perform the various functions, steps, and/or processes described herein with respect to FIGS. 1-12, and 18-23 in various implementations. In some aspects, the memory 2800, the memory 2900, the memory 3000, or the memory 3100 may correspond to the memory 1706 of FIG. 17.

Figure 28:
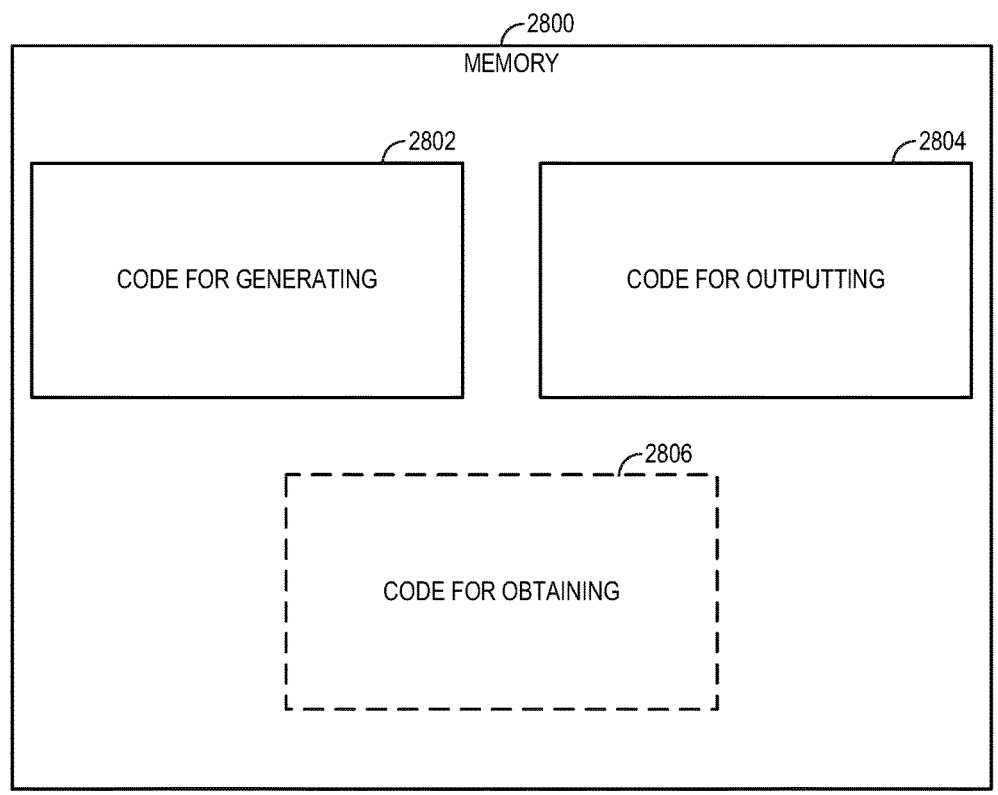
FIG. 28 is a simplified block diagram of several sample aspects of a memory configured with code in accordance with some aspects of the disclosure.

As shown in FIG. 28, the memory 2800 may include one or more of code for generating 2802, code for outputting 2804, or code for obtaining 2806. In some aspects, one of more of the code for generating 2802, the code for outputting 2804, or the code for obtaining 2806 may be executed or otherwise used to provide the functionality described herein for the circuit for generating 2402, the circuit for outputting 2404, or the circuit for obtaining 2406.

Figure 29:
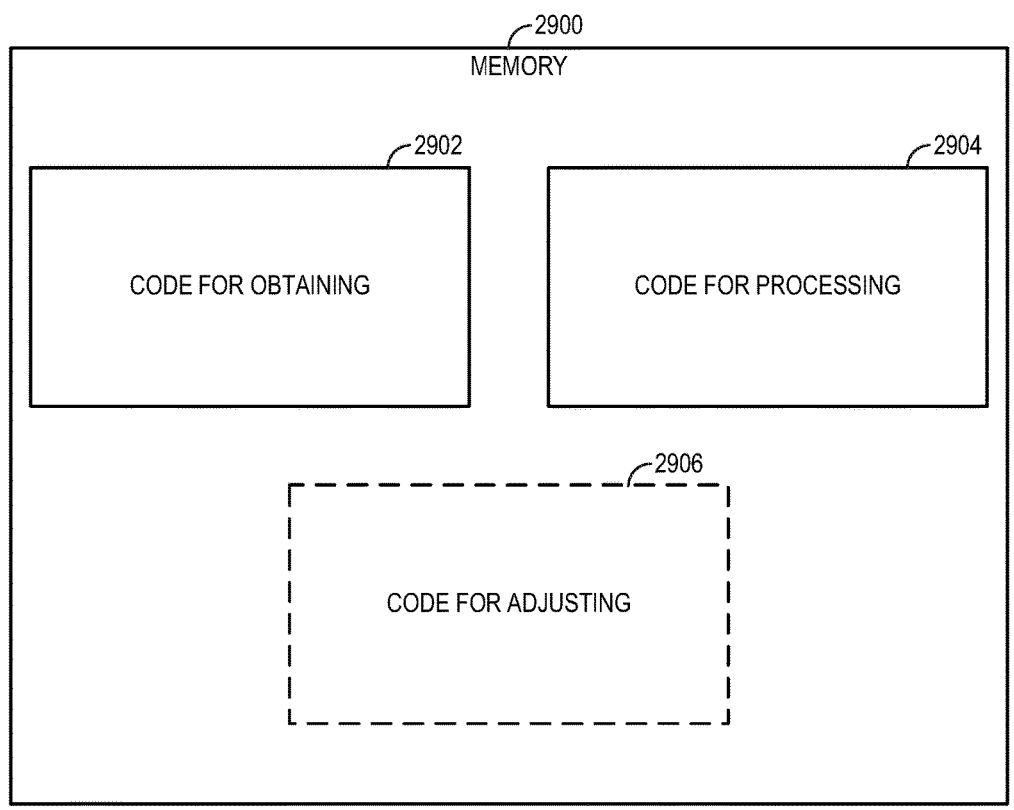
FIG. 29 is a simplified block diagram of several other sample aspects of a memory configured with code in accordance with some aspects of the disclosure.

As shown in FIG. 29, the memory 2900 may include one or more of code for obtaining 2902, code for processing 2904, or code for adjusting 2906. In some aspects, one of more of the code for obtaining 2902, the code for processing 2904, or the code for adjusting 2906 may be executed or otherwise used to provide the functionality described herein for the circuit for obtaining 2502, the circuit for processing 2504, or the circuit for adjusting 2506.

Figure 30:
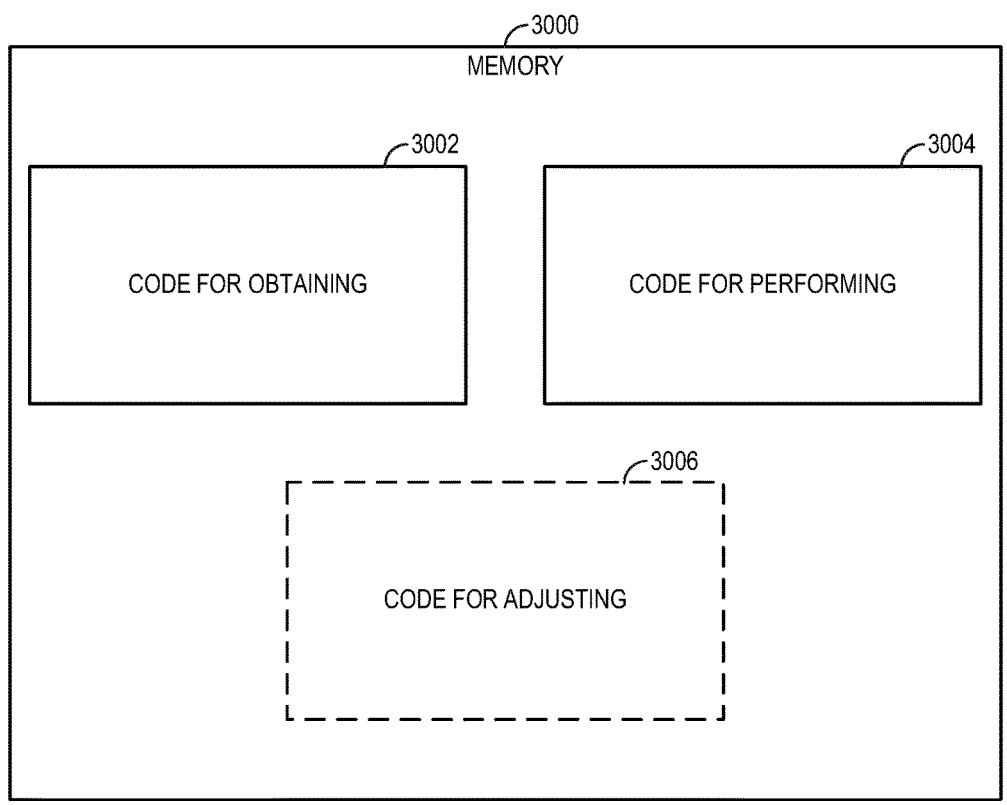
FIG. 30 is a simplified block diagram of several other sample aspects of a memory configured with code in accordance with some aspects of the disclosure.

As shown in FIG. 30, the memory 3000 may include one or more of code for obtaining 3002, code for performing 3004, or code for adjusting 3006. In some aspects, one of more of the code for obtaining 3002, the code for performing 3004, or the code for adjusting 3006 may be executed or otherwise used to provide the functionality described herein for the circuit for obtaining 2602, the circuit for performing 2604, or the circuit for adjusting 2606.

Figure 31:
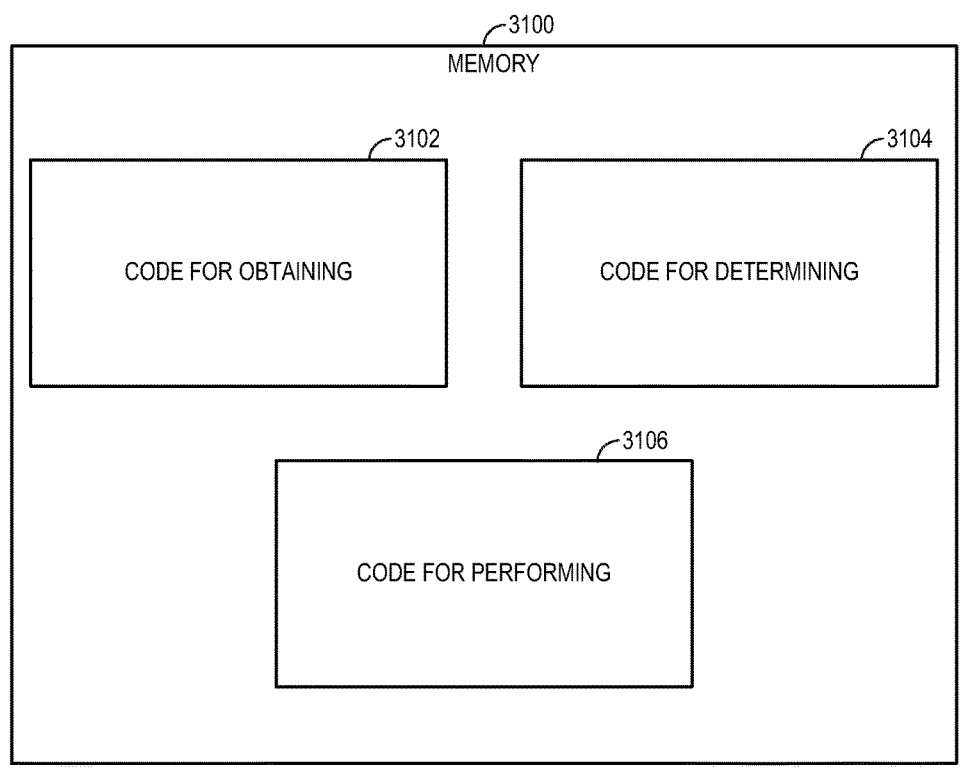
FIG. 31 is a simplified block diagram of several other sample aspects of a memory configured with code in accordance with some aspects of the disclosure.

As shown in FIG. 31, the memory 3100 may include one or more of code for obtaining 3102, code for determining 3104, or code for performing 3106. In some aspects, one of more of the code for obtaining 3102, the code for determining 3104, or the code for performing 3106 may be executed or otherwise used to provide the functionality described herein for the circuit for obtaining 2702, the circuit for determining 2704, or the circuit for performing 2706.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for communication, comprising:
a processing system configured to:
generate a physical layer protocol data unit (PPDU) for Wi-Fi communication comprising a plurality of midambles, a Number of High Efficiency Long Training Field (HE-LTF) Symbols field, and a Doppler bit set to a value of 1, and
repurpose at least one bit of the Number of HE-LTF Symbols field to carry mid-amble update interval information; and
an interface configured to output the data unit for transmission.

2. The apparatus of claim 1, wherein the mid-amble update interval information specifies different mid-amble update intervals associated with different communication parameters.

3. The apparatus of claim 2, wherein the different communication parameters comprise at least one of: different modulation and coding schemes (MCSs), different numbers of spatial streams, different bandwidth, or any combination thereof.

4. The apparatus of claim 1, wherein the mid-amble update interval information specifies ratios between different mid-amble update intervals.

5. The apparatus of claim 1, wherein:
the generation of the data unit comprises generating a packet including a preamble, wherein the preamble includes an IEEE 802.11 High Efficiency SIG-A (HE-SIG-A) field having the Number of HE-LTF Symbols field therein; and
the output of the data unit for transmission comprises output of the packet for transmission.

6. The apparatus of claim 1, wherein:
the generation of the data unit comprises generating a Trigger frame having the Number of HE-LTF Symbols field therein; and
the output of the data unit for transmission comprises output of the Trigger frame for transmission.

7. The apparatus of claim 6, wherein:
the Trigger frame includes a Common Information field; and
the Doppler bit is located in the Common Information field.

8. The apparatus of claim 1, wherein:
the generation of the data unit comprises generating a High Efficiency Multi User Physical Layer Convergence Protocol (PLCP) Protocol Data Unit (HE MU PPDU) including a preamble, the preamble including the Number of HE-LTF Symbols field therein; and
the output for the data unit for transmission comprises output of the HE MU PPDU for transmission.

9. The apparatus of claim 8, wherein:
the HE MU PPDU includes a High Efficiency SIG-A (HE-SIG-A) field; and
the Doppler bit is located in the HE-SIG-A field.

10. The apparatus of claim 1, wherein the mid-amble update interval information specifies:
a first mid-amble update interval associated with a first communication parameter; and
a second mid-amble update interval associated with a second communication parameter, wherein the first mid-amble update interval is different from the second mid-amble update interval and the first communication parameter is different from the second communication parameter.

11. The apparatus of claim 10, wherein:
the first communication parameter comprises a first numbers of spatial streams; and
the second communication parameter comprises a second number of spatial streams.

12. The apparatus of claim 10, wherein:
the first communication parameter comprises a first bandwidth; and
the second communication parameter comprises a second bandwidth.

13. A wireless node, comprising:
a processing system configured to:
generate a physical layer protocol data unit (PPDU) for Wi-Fi communication comprising a plurality of mid-ambles, a Number of High Efficiency Long Training Field (HE-LTF) Symbols field, and a Doppler bit set to a value of 1, and
repurpose at least one bit of the Number of HE-LTF Symbols field to carry mid-amble update interval information; and
a transmitter configured to transmit the data unit.

14. The wireless node of claim 13, wherein the mid-amble update interval information specifies:
a first mid-amble update interval for the wireless node; and
a second mid-amble update interval for another wireless node.

15. An apparatus for communication, comprising:
an interface configured to obtain a physical layer protocol data unit (PPDU) for Wi-Fi communication comprising a Number of High Efficiency Long Training Field (HE-LTF) Symbols field and a Doppler bit; and
a processing system configured to:
determine, based on the Doppler bit being set to a value of 1, that the Number of HE-LTF Symbols field is repurposed to carry mid-amble update interval information,
determine, based on the mid-amble update interval information, where mid-ambles are located in the data unit, and
perform channel estimation for a wireless communication channel based on the mid-ambles.

16. The apparatus of claim 15, wherein:
the obtaining of the data unit comprises obtaining a packet including a preamble, wherein the preamble includes an IEEE 802.11 High Efficiency SIG-A (HE-SIG-A) field having the Number of HE-LTF Symbols field therein.

17. The apparatus of claim 15, wherein:
the obtaining of the data unit comprises obtaining a Trigger frame having the Number of HE-LTF Symbols field therein.

18. The apparatus of claim 15, wherein:
the obtaining of the data unit comprises obtaining a High Efficiency Multi User Physical Layer Convergence Protocol (PLCP) Protocol Data Unit (HE MU PPDU) including a preamble, wherein the preamble includes the Number of HE-LTF Symbols field therein.

19. The apparatus of claim 15, wherein:
the obtaining of the data unit comprises obtaining a Trigger frame including the Number of HE-LTF Symbols field therein.

20. A wireless node, comprising:
a receiver configured to receive a physical layer protocol data unit (PPDU) for Wi-Fi communication data unit comprising a Number of High Efficiency Long Training Field (HE-LTF) Symbols field and a Doppler bit; and
a processing system configured to:
determine, based on the Doppler bit being set to a value of 1, that the Number of HE-LTF Symbols field is repurposed to carry mid-amble update interval information,
determine, based on the mid-amble update interval information, where mid-ambles are located in the data unit, and
perform channel estimation for a wireless communication channel based on the mid-ambles.

* * * * *